(12) United States Patent
Hagiwara et al.

(10) Patent No.: US 9,285,644 B2
(45) Date of Patent: Mar. 15, 2016

(54) SUBSTRATE FOR LIQUID CRYSTAL DISPLAY DEVICE, AND LIQUID CRYSTAL DISPLAY DEVICE

(71) Applicant: TOPPAN PRINTING CO., LTD., Tokyo (JP)

(72) Inventors: Hidesato Hagiwara, Tokyo (JP); Mie Shimizu, Tokyo (JP); Kenzo Fukuyoshi, Tokyo (JP); Takao Taguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 280 days.

(21) Appl. No.: 13/686,159

(22) Filed: Nov. 27, 2012

(65) Prior Publication Data

US 2013/0083264 A1    Apr. 4, 2013

Related U.S. Application Data

(63) Continuation of application No. PCT/JP2011/057373, filed on Mar. 25, 2011.

(30) Foreign Application Priority Data

May 27, 2010   (JP) ................ 2010-121909
May 27, 2010   (JP) ................ 2010-121910

(51) Int. Cl.
*G02F 1/1333*   (2006.01)
*G02F 1/1337*   (2006.01)
(Continued)

(52) U.S. Cl.
CPC ............. *G02F 1/1368* (2013.01); *G02B 5/201* (2013.01); *G02B 5/206* (2013.01); *G02F 1/133707* (2013.01); *G02F 1/134363* (2013.01); *G02F 2001/134381* (2013.01)

(58) Field of Classification Search
CPC ............. G02F 1/134363; G02F 1/1368; G02F 2001/134381; G02B 5/201; G02B 5/206
USPC .................................. 349/110–111
See application file for complete search history.

(56) References Cited

U.S. PATENT DOCUMENTS 5,724,107 A * 3/1998 Nishikawa et al. ............ 349/38
6,040,885 A   3/2000 Koike et al.
(Continued)

FOREIGN PATENT DOCUMENTS

CN   1614491   5/2005
CN   1908786   2/2007
(Continued)

OTHER PUBLICATIONS

Taiwanese Office Action mailed Dec. 12, 2013 in corresponding Taiwanese Patent Application No. 100112719.
(Continued)

*Primary Examiner* — Charles Chang

(57) ABSTRACT

In a substrate for a liquid crystal display device, a black matrix, a transparent electroconductive film and a resin layer are formed above a transparent substrate. The black matrix is a light-shielding layer in which light-shielding pigments are dispersed in a resin, and includes openings. The resin layer is formed above the transparent substrate including the black matrix and the transparent electroconductive film, forms a convex part above the black matrix, and forms, in a region that passes through a center of each of the openings in the black matrix, a concave part.

7 Claims, 32 Drawing Sheets

(51) Int. Cl.
   *G02F 1/1368* (2006.01)
   *G02B 5/20* (2006.01)
   *G02F 1/1343* (2006.01)

(56) References Cited

U.S. PATENT DOCUMENTS

| | | | |
|---|---|---|---|
| 2001/0046019 A1* | 11/2001 | Lee et al. | 349/141 |
| 2002/0145698 A1 | 10/2002 | Imai et al. | |
| 2005/0007524 A1* | 1/2005 | Luo et al. | 349/110 |
| 2005/0117094 A1* | 6/2005 | Kim et al. | 349/110 |
| 2005/0140856 A1* | 6/2005 | Choi | G02F 1/133512 349/110 |
| 2006/0017865 A1* | 1/2006 | Tsubata et al. | 349/106 |
| 2007/0002253 A1 | 1/2007 | Kim et al. | |
| 2008/0084156 A1 | 4/2008 | Choi et al. | |
| 2008/0192198 A1 | 8/2008 | Na et al. | |

FOREIGN PATENT DOCUMENTS

| | | |
|---|---|---|
| CN | 101144952 | 3/2008 |
| CN | 101377593 | 3/2009 |
| JP | 4-56921 | 2/1992 |
| JP | 5-26161 | 2/1993 |
| JP | 7-13164 | 1/1995 |
| JP | 8-292423 | 11/1996 |
| JP | 9-113721 | 5/1997 |
| JP | 9-189899 | 7/1997 |
| JP | 9-244046 | 9/1997 |
| JP | 9-304757 | 11/1997 |
| JP | 10-39128 | 2/1998 |
| JP | 10-96929 | 4/1998 |
| JP | 10-253952 | 9/1998 |
| JP | 10-268292 | 10/1998 |
| JP | 2000-81641 | 3/2000 |
| JP | 2000-155317 | 6/2000 |
| JP | 2002-14353 | 1/2002 |
| JP | 2005-31563 | 2/2005 |
| JP | 2007-34151 | 2/2007 |
| JP | 2008-98161 | 4/2008 |
| JP | 2008-181139 | 8/2008 |
| KR | 10-0818258 | 3/2008 |
| TW | 200516306 | 5/2005 |
| TW | 200530724 | 9/2005 |
| TW | 200844614 | 11/2008 |
| TW | 201015149 | 4/2010 |

OTHER PUBLICATIONS

Korean Office Action mailed Dec. 30, 2013 in corresponding Korean Patent Application No. 10-2012-7030854.

International Search Report of Corresponding PCT Application PCT/JP2011/057373 mailed May 10, 2011.

Office Action of Japanese Application 2010-121910, mailed Aug. 28, 2012.

International Preliminary Report on Patentability mailed Dec. 13, 2012 for corresponding International Application No. PCT/JP2011/057373.

Chinese Office Action dated Oct. 21, 2014 in corresponding Chinese Patent Application No. 201180026258.3.

* cited by examiner

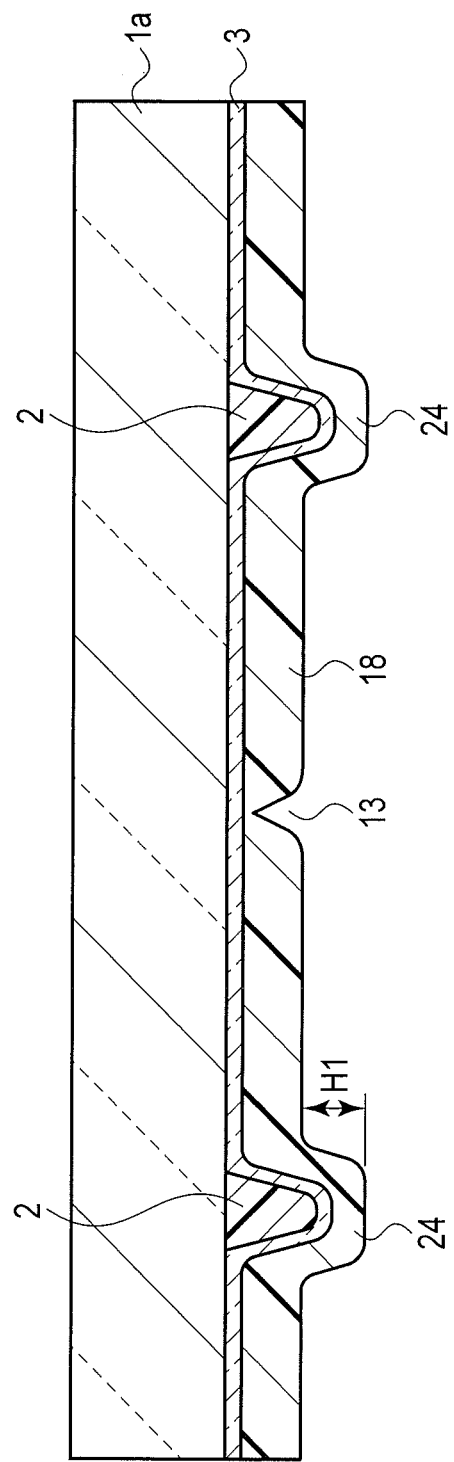
F I G. 16

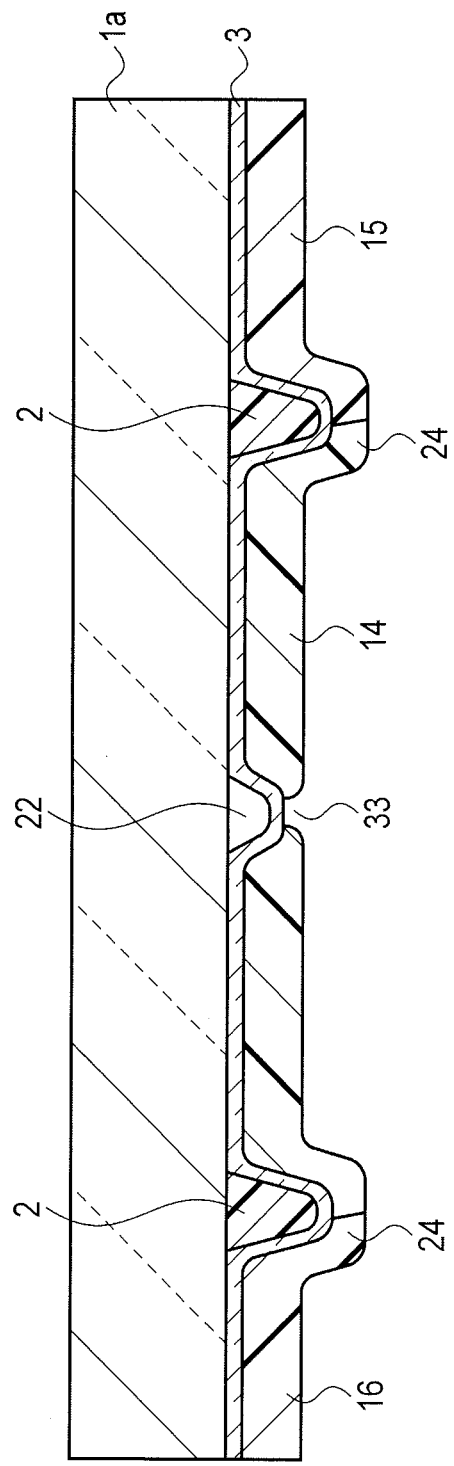
F I G. 26

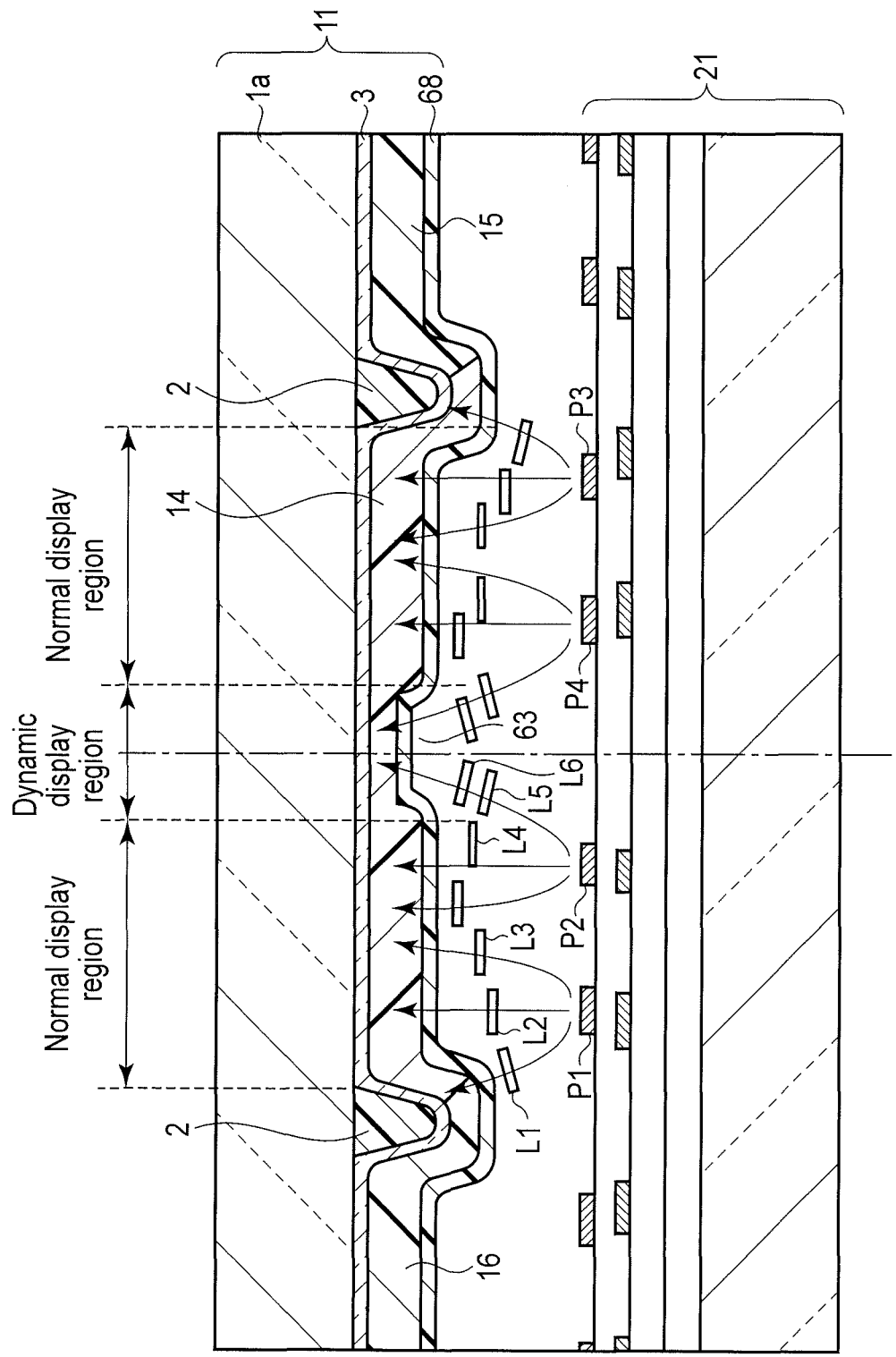
F I G. 32

SUBSTRATE FOR LIQUID CRYSTAL DISPLAY DEVICE, AND LIQUID CRYSTAL DISPLAY DEVICE

CROSS REFERENCE TO RELATED APPLICATIONS

This application is a Continuation application of PCT Application No. PCT/JP2011/057373, filed Mar. 25, 2011 and based upon and claiming the benefit of priority from prior Japanese Patent Applications No. 2010-121909, filed May 27, 2010; and No. 2010-121910, filed May 27, 2010, the entire contents of all of which are incorporated herein by reference.

BACKGROUND OF THE INVENTION

1. Field of the Invention

The present invention relates to a substrate for a liquid crystal display device, and a liquid crystal display device using the substrate. The invention relates particularly to a color filter substrate for a vertically aligned liquid crystal display device, and a vertically aligned liquid crystal display device using the color filter substrate.

2. Description of the Related Art

In recent years, it has been desired to make an image quality of a thin type display device such as a liquid crystal display higher, decrease a cost thereof, and save electric power therefor. A color filter for the liquid crystal display device is required to have a sufficient color purity, a high contrast, flatness, and other properties to match with a higher image-quality display.

For high image-quality liquid crystal displays, various liquid crystal aligning modes or liquid crystal driving modes such as VA (vertically alignment), HAN (hybrid-aligned nematic), TN (twisted nematic), OCB (optically compensated bend), CPA (continuous pinwheel alignment), and the like, are suggested. As a result, a wide-viewing-angle and high-speed-response display has been put into practical use.

For a liquid crystal display device in the VA mode, which has a structure in which liquid crystals are aligned vertically with a plane of a substrate, such as a glass piece, to give a wide viewing angle and easily operate in a high-speed response, in the HAN mode, which is effective for giving a wide viewing angle, or in other mode, higher-level of flatness for a color filter (evenness of the film thickness thereof, and a decrease in irregularities in the surface of the color filter) and an electrical property, such as a dielectric constant, are desired. Such the high image-quality liquid crystal display pursues, as a main theme, a technique of making a liquid crystal cell thickness (liquid crystal layer thickness) thereof smaller to decrease coloration when the devices are viewed from an oblique direction. For the VA mode, developments of various improved modes have been advanced, and examples of the modes include MVA (multi-domain vertically alignment), PVA (patterned vertically alignment), VAECB (vertically alignment electrically controlled birefringence), VAHAN (vertical alignment hybrid-aligned nematic), and VATN (vertically alignment twisted nematic). A liquid crystal display device in a vertical electric field mode, such as the VA mode, in which a driving voltage is applied along the liquid crystal thickness direction, pursues, as main themes, a higher-speed liquid crystal response, a wide viewing angle technique, and a higher transmittance. About the MVA technique, in order to overcome a problem in that at the time of a liquid-crystal-driving-voltage applying, vertically aligned liquid crystals are unstable (that about liquid crystals initially having vertical alignment to a surface of a substrate, the direction in which the liquid crystals are inclined (brought down) at the time of the voltage applying is not easily settled), disclosed is a technique of creating plural slit-form convex part, forming liquid crystal domains between these slits, and further forming domains having plural aligned directions, thereby ensuring a wide viewing angle. Patent Literature 1 discloses a technique for forming liquid crystal domains using first and second alignment regulating structures (slits).

Patent Literature 2 discloses a technique for forming four liquid crystal domains using light alignment. This patent literature discloses that the following are necessary to ensure a wide viewing angle: conducting alignment treatment plural times, which is related to a strict control of a tilt angle (into 89 degrees); and alignment axes different in angle from each other by 90°, in each domain.

Patent Literatures 3 and 4 each disclose a technique for controlling vertically aligned liquid crystals by effect of an oblique electric field using a transparent electroconductive film (a transparent electrode, a display electrode or a third electrode) of a color filter substrate side, and first and second electrodes of the array substrate side. According to Patent Literature 3, liquid crystals having negative dielectric constant anisotropy are used. According to Patent Literature 4, liquid crystals having positive dielectric constant anisotropy are described. Patent Literature 4 never describes any liquid crystal having the negative dielectric constant anisotropy.

Usually, a liquid crystal display device in the VA mode, the TN mode, or other mode has a basic structure in which liquid crystals are sandwiched between a color filter substrate having a common electrode, and pixel electrodes (for example, a transparent electrode formed into a comb-teeth-form pattern and connected electrically to TFT elements) for driving the liquid crystals and an array substrate. In this structure, a driving voltage is applied between the common electrode on the color filter and the pixel electrodes formed in the array substrate side to drive the liquid crystals. A transparent electroconductive film as the pixel electrodes or the common electrode on a surface of the color filter is usually a thin film of an electroconductive metal oxide, such as ITO (indium tin oxide), IZO (indium zinc oxide), or IGZO (indium gallium zinc oxide).

As a technique disclosing a color filter, for example, blue pixels, green pixels, red pixels or a black matrix, Patent Literature 5 discloses, for example, a technique of forming a transparent electroconductive film above the black matrix and the color pixels, and further laminating an overcoat layer thereon. Patent Literature 6 discloses a technique of forming a cross section of the black matrix into a trapezoidal from. Patent Literature 3 described above describes (in, for example, FIGS. 7 and 9 thereof) a technique of forming a color filter onto a transparent electrode (transparent electroconductive film), which is a technique using plural stripe electrodes and positive dielectric constant anisotropy. Additionally, Patent Literature 7 discloses a technique of forming a color filter onto a transparent electroconductive film.

CITATION LIST

Patent Literature

Patent Literature 1: Japanese Patent No. 3957430
Patent Literature 2: Jpn. Pat. Appln. KOKAI Publication No. 2008-181139
Patent Literature 3: Japanese Patent No. 2859093
Patent Literature 4: Japanese Patent No. 4364332

Patent Literature 5: Jpn. Pat. Appln. KOKAI Publication No. 10-39128

Patent Literature 6: Japanese Patent No. 3228139

Patent Literature 7: Jpn. Pat. Appln. KOKAI Publication No. 5-26161

BRIEF SUMMARY OF THE INVENTION

Technical Problems

As described above, in the vertically aligned liquid crystal display device, liquid crystal domains are formed by use of alignment regulating structures called slits to ensure the wide viewing angle (MVA technique). When the liquid crystals have the negative dielectric constant anisotropy, specifically, the driving voltage is applied to the liquid crystals at a position between two slits made of resin, and the liquid crystals are formed above such as the color filter, the liquid crystals are inclined into a direction perpendicular to the slits as the display device is viewed in plan. Thus, the liquid crystals are aligned horizontally to the substrate plane. However, the liquid crystals at the center of the space between the two slits are not settled into a single direction notwithstanding the voltage applying, so that the liquid crystals are turned into spray alignment or bend alignment. Such an alignment turbulence of the liquid crystals gives roughness or unevenness to a liquid crystal display. Moreover, in the MVA mode, such a quantitative level that the liquid crystals are inclined is hard to be minutely controlled by the driving voltage so as to cause a problem of half-tone display, in addition to the above-mentioned problem. The linearity between the driving voltage and a display (i.e., response time) is particularly low, therefore, there is a problem of a half-tone display based on a low driving voltage.

To solve such problems, it is very effective to use a manner using first, second and third electrodes so that the alignment of the liquid crystals is controlled by effect of the oblique electric field, as described in Patent Literatures 3 and 4. The oblique electric field makes it possible to set the direction in which the liquid crystals are inclined. Moreover, the oblique electric field makes it easy to control the quantitative level that the liquid crystals are inclined to produce a large advantageous effect for the half-tone display.

However, even these techniques are insufficient as countermeasures against a disclination of the liquid crystals. The disclination is a problem in that, in a pixel (the pixel is a minimum unit for display based on liquid crystals and is identical in meaning to a rectangular pixel described in the invention), regions having different light transmittances are generated by an unintended alignment turbulence of the liquid crystals or non-alignment thereof.

According to Patent Literature 3, in order to fix a disclination at a center of each pixel, an alignment control window having no transparent electroconductive film at a pixel-center part (portion) of a counter electrode (third electrode) is provided. However, the literature does not disclose any method for overcoming a disclination in the periphery of the pixel. Moreover, the literature does not disclose any method for minimizing the disclination although the disclination at the pixel center can be fixed. Furthermore, the literature does not describe a technique for improving a response of the liquid crystals.

Patent Literature 2 discloses that it is necessary to control the tilt angle of the liquid crystals strictly into 89 degrees and conduct alignment treatment four times in order to ensure a wide viewing angle.

According to Patent Literature 4, a dielectric layer is laminated above the transparent electroconductive film (transparent electrode), and the oblique electric field is favorably increased accordingly. However, as illustrated in FIG. 7 in Patent Literature 4, vertically aligned liquid crystals remain at the center of each pixel and an edge part of the pixel after the voltage is applied thereto, causing a problem in that the pixel is decreased in transmittance or an aperture rate. When liquid crystals having positive dielectric constant anisotropy are used (Patent Literature 4 discloses, in the description and Examples thereof, no liquid crystal having negative dielectric constant anisotropy), the pixel is not easily improved in transmittance because of the disclination at the pixel center. Thus, this technique is unlikely to be adopted for a transflective type liquid crystal display device.

In the above-mentioned situation, an object of the invention is to provide a substrate for a liquid crystal display device that decreases a disclination, is bright and has good response, and is optimal for driving liquid crystals by an oblique electric field, and a liquid crystal display device including the substrate.

Solution to the Problems

A first aspect of the present invention provides a substrate for a liquid crystal display device including a black matrix, a transparent electroconductive film and a resin layer that are each formed above a transparent substrate. The black matrix is a light-shielding layer in which light-shielding pigments are dispersed in a resin, and includes openings. The resin layer is formed above the transparent substrate including the black matrix and the transparent electroconductive film, forms a convex part above the black matrix, and forms, in a region that passes through a center of each of the openings in the black matrix, a concave part.

A second aspect of the present invention provides a substrate for a liquid crystal display device including: a transparent substrate; a black matrix which is formed above the transparent substrate, is a light-shielding layer in which light-shielding pigments are dispersed in a resin, and has openings; a transparent electroconductive film which is formed above the transparent substrate including the black matrix; and color pixels having colors which are formed in each of pixel regions divided by the openings, and are formed above the transparent electroconductive film.

A third aspect of the present invention provides a liquid crystal display device including: the liquid crystal display device substrate according to the first or the second aspect; an array substrate which is arranged opposite to the liquid crystal display device substrate, and including liquid-crystal-driving elements arranged in a matrix form thereon; and liquid crystals which are held between the liquid crystal display device substrate and the array substrate.

A fourth aspect of the present invention provides a liquid crystal display device including: a color filter substrate and an array substrate. The color filter substrate and the array substrate are opposed and stuck to each other via liquid crystals. The color filter substrate includes a black matrix having rectangular openings, a transparent electroconductive film, color pixels, and a resin layer above a transparent substrate. The array substrate includes elements driving the liquid crystals and being arranged in a matrix form. The resin layer is arranged directly or indirectly above the transparent electroconductive film. A convex part protruded from a surface of the resin layer is formed. A convex part is formed in a region that passes through a center of each of the rectangular openings in the black matrix. The array substrate includes a comb-teethform first electrode and a comb-teeth-form second electrode each of which includes electroconductive metal-oxides which are transparent in a range of visible wavelengths. The second electrode is arranged below the first electrode via an insulating layer between the first and second electrodes. The second electrode is protruded from an end of the first electrode into a direction along which the liquid crystals are inclined.

Advantageous Effects of Invention

According to the invention, a substrate for a liquid crystal display device that decreases a disclination, is bright and has good responses, and is optimal for driving liquid crystals by an oblique electric field, and a liquid crystal display device including the substrate, are provided.

BRIEF DESCRIPTION OF THE SEVERAL VIEWS OF THE DRAWING

FIG. 16 is a partial sectional view illustrating a substrate according to Example 1;

FIG. 26 is a sectional view illustrating a color filter substrate according to Example 11;

FIG. 32 is a sectional view illustrating a liquid crystal display device according to Example 17.

DETAILED DESCRIPTION OF THE INVENTION

Figure 1:
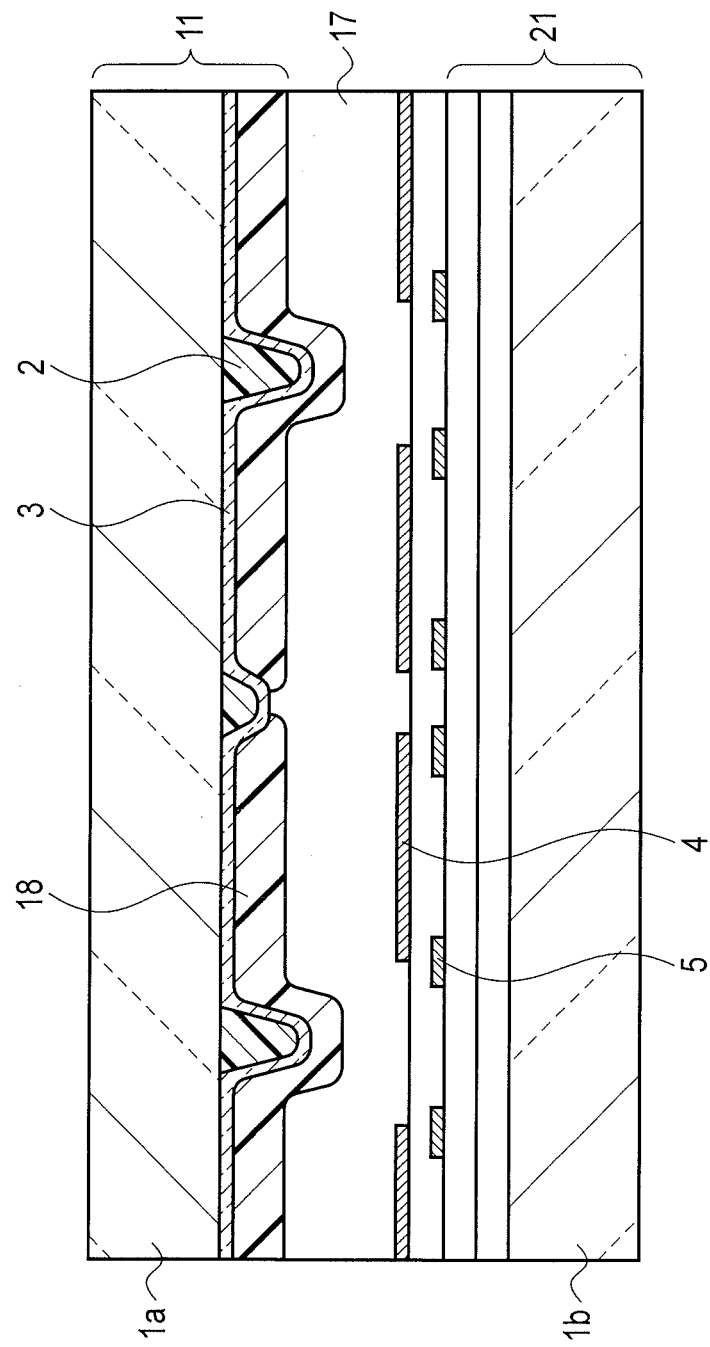
FIG. 1 is a schematic sectional view of a vertically aligned liquid crystal display device according to an embodiment of the invention.

Hereinafter, embodiments of the present invention will be described.

A first embodiment of the invention has a prerequisite condition of using a liquid crystal display device including a first substrate with a resin layer formed above its surface and a color filter or no color filter and a second substrate above which a liquid crystal driving element such as a TFT is formed, and then opposing and laminating (bonding) the substrates to sandwich a liquid crystal layer therebetween. The first embodiment of the invention additionally utilizes a technique of making use of an oblique electric field generated by an electrode structure having the following: a transparent electroconductive film as a third electrode arranged to the first substrate; a first electrode as a pixel electrode; and a second electrode having a different potential from the first electrode.

Furthermore, the inventors have found out that: a resin layer is arranged over the first substrate to cover a black matrix; a convex part (region) protruded from the front surface of the resin layer is made above the black matrix; a concave part is made in a region that passes through a center of each opening in the black matrix; and these can be used for controlling alignment of the liquid crystals. The inventors have provided a new technique obtained by combining this finding with a structure of the third electrode (transparent electroconductive film). The convex part is an overlap part made of the black matrix and the resin layer, and the alignment of liquid crystals at an inclined part of this convex part is used to incline the liquid crystals when a driving voltage is applied.

Similarly, at the concave part also, the liquid crystal alignment at a shoulder part of the resin layer is used to incline the liquid crystals. Motions of the liquid crystals will be detailed in Examples that will be given later. The height of the convex part ranges preferably from 0.5 to 2 µm. If the height is 0.4 µm or less, an advantageous effect of "a trigger for inclining the liquid crystals" is insufficient at a time of voltage applying. If the height is more than 2 µm, an inconvenience may be caused to the flow of the liquid crystals when cells of the liquid crystals are produced.

The inclined part of the black matrix may have a round shape, and a sectional shape of the black matrix is, for example, a semilunar, trapezoidal, triangular shape in a display region. A inclination angle of the black matrix from a substrate plane is not particularly specified as far as the height of the convex part is more than 0.5 µm. When an aperture rate (transmittance of the rectangular pixels) is allowable, the angle may be a low inclination angle such as 2° or 3°, and needs only not to give a reverse-tapered form (the form of an upside-down trapezoid, the upper side of which is longer than the bottom side). However, the inclination angle is preferably from 30 to 80° to restrict the aperture rate effectively.

A second embodiment of the invention is applied to liquid crystals having initial alignment that are vertical alignment, and has a prerequisite condition of using a liquid crystal display device including a color filter substrate and an array substrate above which a liquid crystal driving element such as a TFT is formed, and then opposing and laminating the substrates to sandwich a liquid crystal layer for vertical alignment therebetween. The second embodiment of the invention additionally utilizes a technique of making use of an oblique electric field generated by an electrode structure having the following: a transparent electroconductive film as a third electrode arranged to the color filter substrate to cover a black matrix; a first electrode as a pixel electrode; and a second electrode having a different potential from the first electrode.

Furthermore, the inventors have found out that: a convex part protruded from a front surface of the color pixels is made above the black matrix; a concave part is made in a region that passes through a center of each of the color pixels; and these can be used for controlling alignment of the liquid crystals. The inventors have provided a new technique obtained by combining this finding with a structure of the third electrode (transparent electroconductive film). The convex part is an overlap part (region) made of different-two-color pixels out of the color pixels, and the alignment of the liquid crystals at an inclined part of this convex part is used to bring the liquid crystals down when a driving voltage is applied.

Technical terms in the present specification are briefly described herein.

A black matrix is a light-shielding pattern around pixels each of which is a minimum unit for display, or along both sides of the pixel in order to increase a contrast for liquid crystal display. Its light-shielding layer is a coating film in which light-shielding pigments are dispersed in a transparent resin, and is generally a light-shielding coating film having photosensitivity and generated by performing pattern-formation in a photolithographic manner including light exposure and development.

Rectangular pixels denote respective openings in the black matrix, and each have the same meaning as the above-mentioned pixel. A color layer is a coating film in which organic pigments that will be described later are dispersed in a transparent resin. Members obtained by forming the color layer onto rectangular pixels in a photolithographic manner to have a pattern are called color pixels.

The liquid crystals applicable to the first embodiment are liquid crystals having vertical alignment or parallel alignment as initial alignment (when no driving voltage is applied thereto). The liquid crystals applicable to the second embodiment are liquid crystals having vertical alignment as initial alignment (when no driving voltage is applied thereto). The dielectric constant anisotropy of the liquid crystals may be positive or negative. When the liquid crystals having negative dielectric constant anisotropy are applied to the present embodiments, an alignment treatment of an alignment film for setting the tilt angle can be omitted. In other words, the alignment film used in each of the first and second embodiments needs only to be subjected to heat treatment after the film is formed by printing. Thus, rubbing treatment, optical alignment or other alignment treatment can be omitted. In the first and second embodiments, the transmittance of the center of their rectangular pixels can be raised to make it possible to supply a color filter substrate in which importance is placed on brightness rather than color purity, for example, a color filter substrate suitable for a transflective type liquid crystal display device.

The materials of the first and second electrodes on the array substrate side of the liquid crystal display device according to each of the first and second embodiments may be a thin film of electroconductive metal-oxides such as ITO. Alternatively, a metal thin film higher in electroconductivity than the metal-oxide thin film may be used. In the case of a reflection type or a transflective type liquid crystal display device, a thin film of aluminum or an aluminum alloy may be used for either the first or second electrode.

In the first and second embodiments, the dielectric constant of each of their color layers, which is relatively an impotent property, is determined substantially unequivocal in accordance with the proportion of organic pigments added as a colorant to the transparent resin; thus, the dielectric constant cannot be easily adjusted within a large range. In other words, the kind or the content by percentage of the organic pigments in the color layer is set in accordance with a color purity necessary for the liquid crystal display device. By the kind or content, the dielectric constant of the color layer is substantially determined. When the proportion of the organic pigments is made high and the color layer is made thin, the dielectric constant can be adjusted to 4 or more. When a high-refractive-index material is used as the transparent resin, the dielectric constant can slightly be increased.

It may be optimize the respective thicknesses of the color layer and the resin layer depending on a relationship thereof with the cell gap (liquid crystal layer thickness) of the liquid crystals to be used. For example, when the thicknesses of the color layer and the resin layer become small from the viewpoint of required electrical properties, the thickness of the liquid crystal layer can be made large. When the film thicknesses of the formers are large, the thickness of the liquid crystal layer can be made small, corresponding to the large thicknesses.

The first and second electrodes are electrically insulated from each other in the thickness direction by an insulating layer, as will be described later. The thicknesses of the color layer, the resin layer and the insulating layer may be adjusted in accordance with the thickness of the liquid crystal layer, the dielectric constants thereof, applied voltage, and driving conditions. When the insulating layer is formed to be made of SiNx (silicon nitride), a practical film thickness of this insulating layer ranges from 0.1 to 0.5 µm. The positions of the first and second electrodes in the film thickness may be positions reverse thereto. In the liquid crystal display devices according to the present embodiments, effective use can be made of an oblique electric field; thus, the devices can be increased in transmittance by extending a range which electric lines of force reach at the time of the driving-voltage applying into the direction of the thickness of films including the liquid crystal layer and the transparent resin layer.

Hereinafter, a description will be made about the motion of a structure in which a transparent electroconductive film is laminated above each of liquid crystal display device substrates according to each of the present embodiments to cover a black matrix; and the motion of an overlap part of a resin layer or color layer above the black matrix, or of a concave part passing the center of each pixel region.

FIG. 1 is a schematic sectional view of a vertically aligned liquid crystal display device according to the first embodiment of the invention. This liquid crystal display device has a structure in which a substrate 11 and an array substrate 21 are stuck to each other in such a form that liquid crystals 17 are sandwiched therebetween. The substrate 11 is formed by forming, onto a transparent substrate 1a, a black matrix 2, a third electrode 3 which is a transparent electroconductive film, and a resin layer 18 successively. In the array substrate 21, second electrodes 4 and third electrodes 5 are formed above a transparent substrate 1b. Illustration of a protecting layer, an alignment film, a polarizing plate, a retardation film, and others are omitted.

Figure 2:
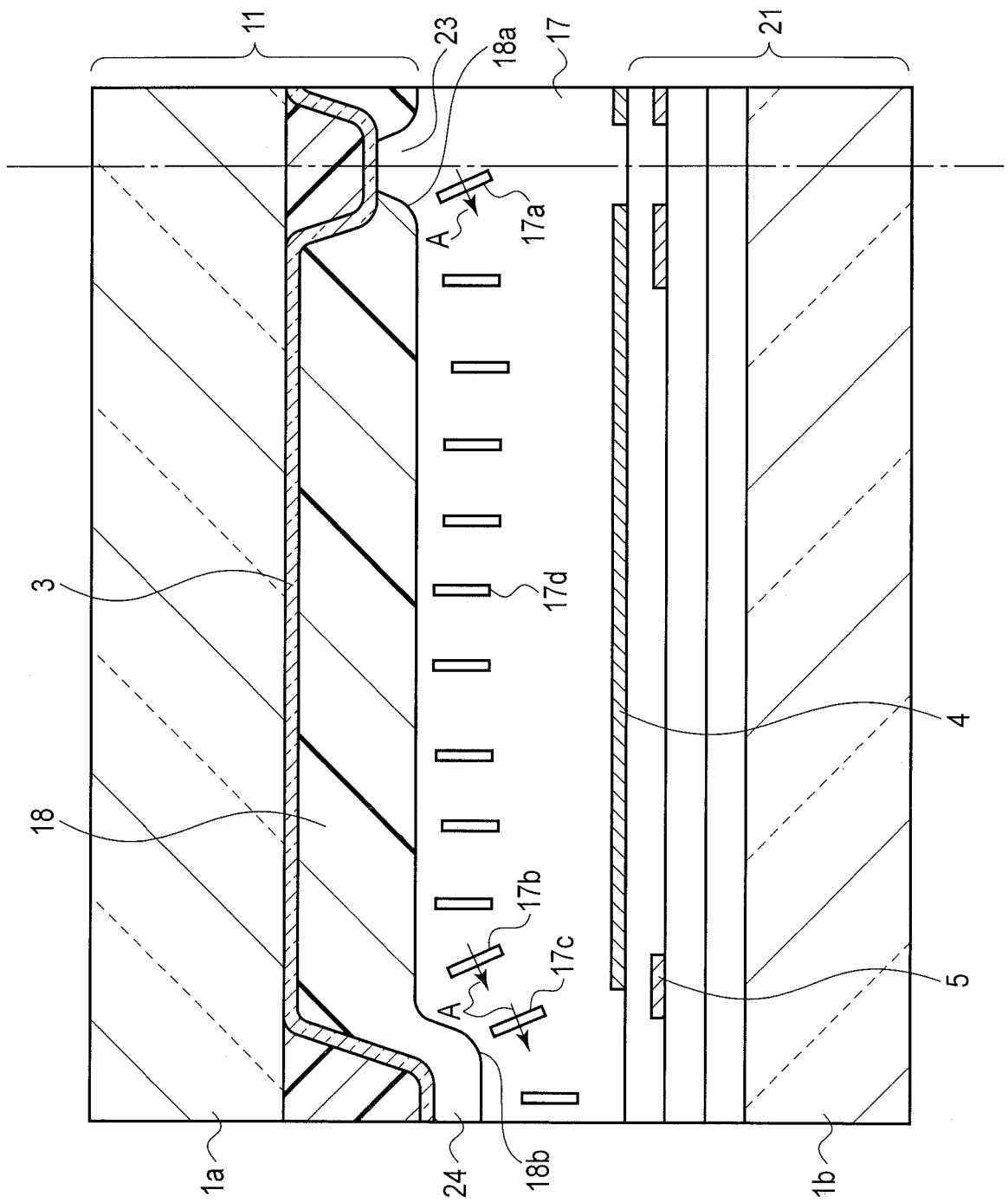
FIG. 2 is a view illustrating, on an enlarged scale, a ½ region of a green pixel 14 of the vertically aligned liquid crystal display device illustrated in FIG. 1.

FIG. 2 is a sectional view illustrating, on an enlarged scale, a ½ region of an opening in FIG. 1, this opening being a rectangular opening when viewed in plan. The polarizing plate is in a crossed Nichol form, and the liquid crystal display device is a normal black liquid crystal display device. For example, the polarizing plate may be a polarizing plate which is yielded by drawing a polyvinyl alcohol based organic polymer containing iodine, and which has an absorption axis in the drawn direction by the drawing. FIG. 2 illustrates respective alignment states of liquid crystal molecules 17a, 17b, 17c and 17d in the vertically aligned liquid crystals 17 in the state that no voltage is applied to the third electrode 3, which is the transparent electroconductive film formed to the substrate 11, and the first electrodes 4 and the second electrodes 5 formed to the array substrate 21.

The liquid crystals at the center of the rectangular opening (½ pixel) is aligned vertically to the plane of the pixel. However, the liquid crystal molecule 17a, which is at a shoulder part 18a of a concave part 23, and the liquid crystal molecules 17b and 17c, which are at a shoulder part 18b of a convex part 24, are slightly obliquely aligned. When a liquid-crystal-driving voltage is applied in this obliquely aligned state, the liquid crystal molecules 17a, 17b and 17c are inclined into the direction of arrows A. The formation of the concave part 23 and the convex part 24 causes the liquid crystal molecules 17a, 17b and 17c to be substantially tilted without subjecting this liquid crystal device to rubbing or other alignment treatment.

In the present embodiment, use may be made of both of liquid crystals having negative dielectric constant anisotropy, and liquid crystals having positive dielectric constant anisotropy. As the liquid crystals having negative dielectric constant anisotropy, use may be made of, for example, nematic liquid crystals having a birefringence of about 0.1 at room temperature or thereabout. About the liquid crystals having positive dielectric constant anisotropy, the scope of species to be selected is wide; thus, various liquid crystal materials may be used. The thickness of the liquid crystal layer does not need to be particularly limited. The Δnd of a liquid crystal layer usable effectively in the embodiment ranges from about 300 to 500 nm.

In examples of the invention which will be detailed later, use may be made of a liquid crystal material including, in the molecular structure thereof, a fluorine atom (hereinafter referred to as a fluorine-containing liquid crystal) as the vertically aligned liquid crystal material. When a liquid-crystal-driving voltage is applied (to the electrodes), an intense electric field is substantially generated at protruded parts of the first and second electrodes; thus, the liquid crystal driving can be attained by use of a liquid crystal material lower in dielectric constant (smaller in dielectric constant anisotropy) than liquid crystal materials used in conventional vertical alignment. In general, liquid crystal material small in dielectric constant anisotropy is low in viscosity; thus, when substantially the same electric field strength (as applied to liquid crystal material large in the anisotropy) is applied (to the material small therein), a higher-speed response is attained. Moreover, because the fluorine-containing liquid crystal is low in dielectric constant, the liquid crystal takes in a small amount of ionic impurities. Thus, the fluorine-containing liquid crystal is also small in performance-deteriorations, such as a decline of voltage retention rate, based on impurities so that an uneven display is not easily generated. The alignment film, the illustration of which is omitted, may be, for example, can be hardened from a polyimide based organic polymer film by heating. One to three retardation films may be used in such a form that the plate(s) is/are laminated with one or more of the polarizing plates.

In the embodiment, when the liquid crystals have negative dielectric constant anisotropy, the motions of the vertical alignment liquid crystals are inclined into a horizontal direction at the time of the driving-voltage applying. When the liquid crystals have positive dielectric constant anisotropy, the motions of the horizontal alignment liquid crystals are tilted up to a vertical direction at the time of the driving-voltage applying.

Figure 3:
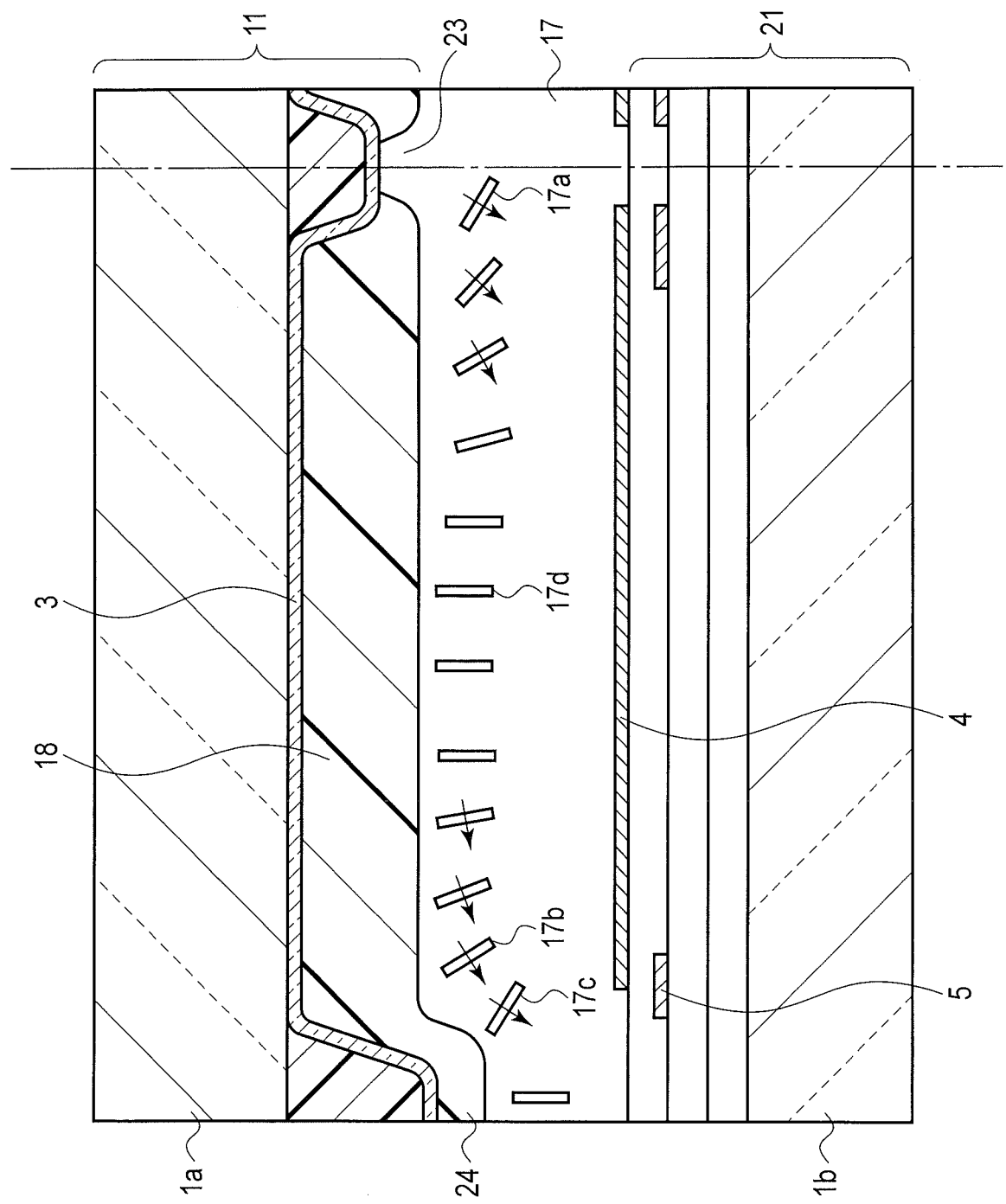
FIG. 3 is a view describing motions of liquid crystals starting to be inclined in the vertically aligned liquid crystal display device illustrated in FIG. 1 just after a driving voltage is applied thereto.

FIG. 3 is a view demonstrating motions of the liquid crystals which begin to be inclined just after the driving-voltage applying. Specifically, with the voltage applying, first, the liquid crystal molecules 17a, 17b and 17c begin to be inclined, and subsequently liquid crystal molecules around these liquid crystal molecules are inclined. In the concave part 23 and the convex part 24, the transparent resin layer, which is a dielectric body, is thin or absent; thus, the applied driving voltage is easily transmitted to the liquid crystal molecules unlike that of the pixel center, so that the motions of the liquid crystal molecules in these regions functions as a trigger for motions that the liquid crystals are inclined. In an opposite-side ½ pixel of the pixel, the direction in which the liquid crystals are inclined is a reverse direction, which is not illustrated in FIG. 3. Accordingly, optical compensation in a half-tone display can be attained depending only on the value of the driving voltage. As a result, a wide visual field angle can be ensured even without forming four multi-domains as in MVA liquid crystals. In a half-tone (for example, the individual liquid crystal molecules are in the state of being oblique), the liquid crystal alignment thereof is liquid crystal alignment that the ½ pixel in FIG. 3 and the opposite-side ½ pixel have inclination gradients reverse to each other, so that these ½ pixels, which are reverse to each other, attain a visual-angle enlargement.

Figure 4:
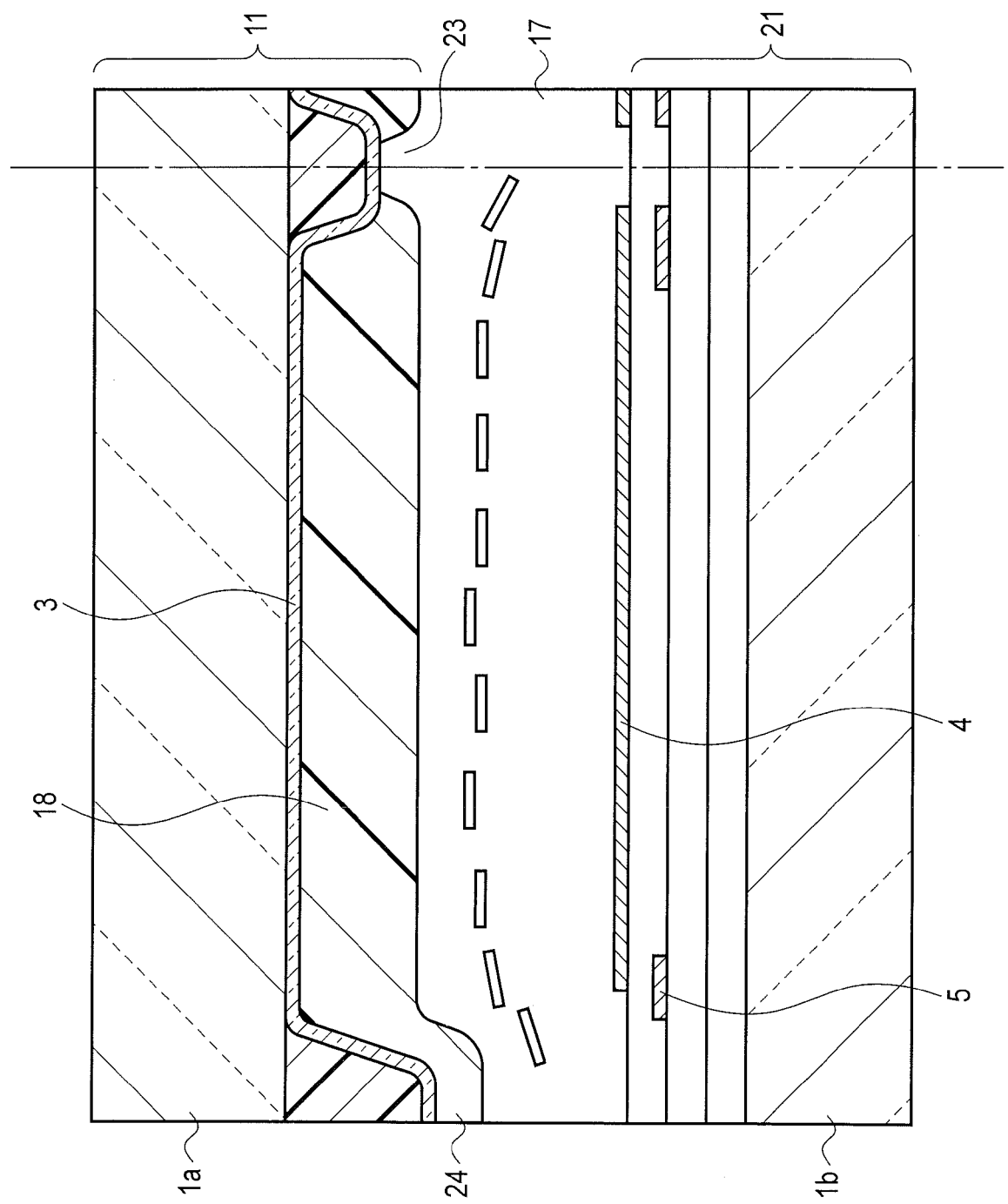
FIG. 4 is a view illustrating a state that liquid crystal molecules in the vertically aligned liquid crystal display device illustrated in FIG. 1 are aligned at the time of white display after the driving voltage is applied thereto.

FIG. 4 is a view illustrating a state that the liquid crystal molecules are aligned at the time of white display after the driving-voltage applying. As illustrated in FIG. 4, the liquid crystal molecules are aligned in substantially parallel to the substrate plane.

The following will describe the motions of liquid crystal molecules in a liquid crystal display device in which liquid crystals having positive dielectric constant anisotropy are used.

Figure 5:
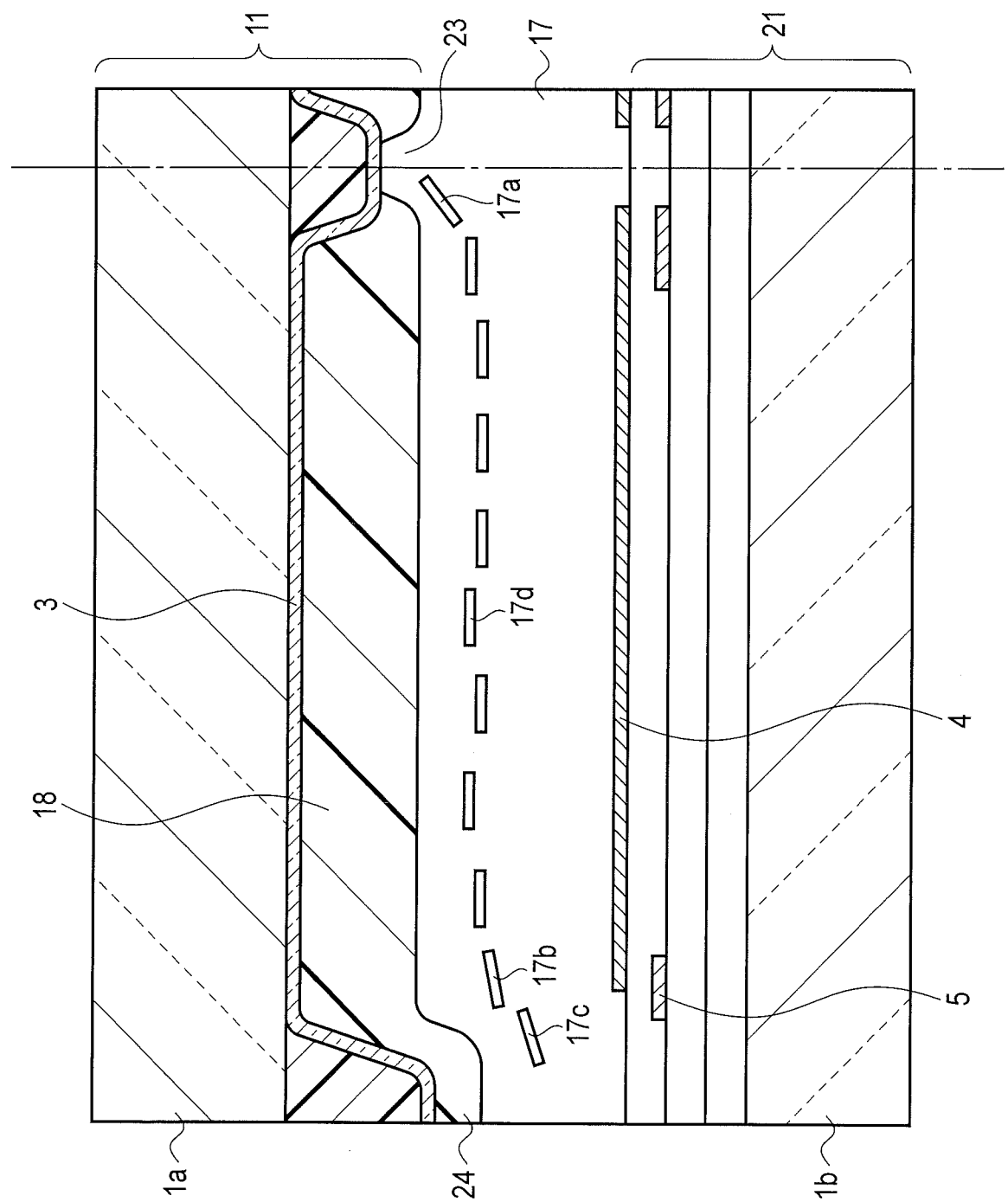
FIG. 5 is a view illustrating an alignment state of the liquid crystal molecules of liquid crystals aligned horizontally in a state that no voltage is applied to a third, first and second electrodes.

FIG. 5 illustrates an alignment state of the liquid crystal molecules 17a, 17b, 17c and 17d which are the horizontally aligned liquid crystals in the state that no voltage is applied to the third electrode 3, the first electrode 4, and the second electrode 5 which are transparent electroconductive films. The liquid crystals at the center of the pixel (½ pixel) is aligned vertically to the pixel plane; however, liquid crystal molecules at respective shoulder parts 14b and 14a of the convex part 24 and the concave part 23 are slightly obliquely aligned. When a liquid-crystal-driving voltage is applied to the electrodes in this oblique aligned state, the liquid crystal molecules 17a, 17b, and 17c are inclined into respective directions of arrows as illustrated in FIG. 6.

Figure 6:
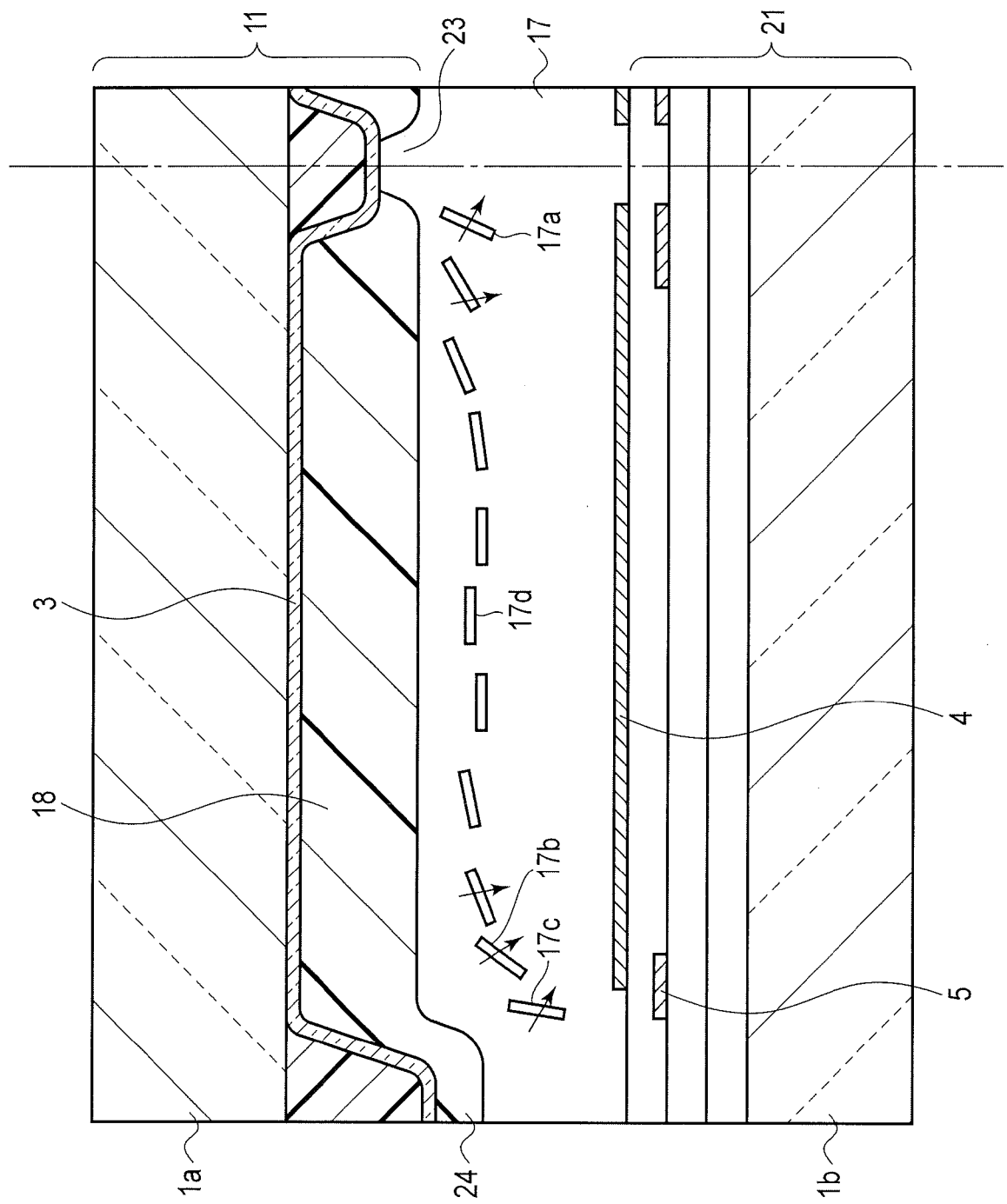
FIG. 6 is a schematic sectional view describing motions of the liquid crystals starting to be inclined just after the driving voltage is applied thereto.

FIG. 6 is a schematic sectional view describing the motions of the liquid crystals beginning to be inclined just after the driving-voltage applying. With the voltage applying, first, the liquid crystal molecules 17a, 17b, and 17c begin to be raised up into a vertical direction, and subsequently liquid crystal molecules around these liquid crystal molecules are raised up. In the convex part 24 and the concave part 23, the transparent resin layer, which is a dielectric body, is thin or absent; thus, the applied driving voltage is easily transmitted to the liquid crystal molecules unlike that of the pixel center, so that the motions of the liquid crystal molecules in these regions functions as a trigger for motions that the liquid crystals are inclined. In an opposite-side ½ pixel of the pixel, the direction in which the liquid crystals are inclined is a reverse direction, which is not illustrated in FIG. 6.

Figure 7:
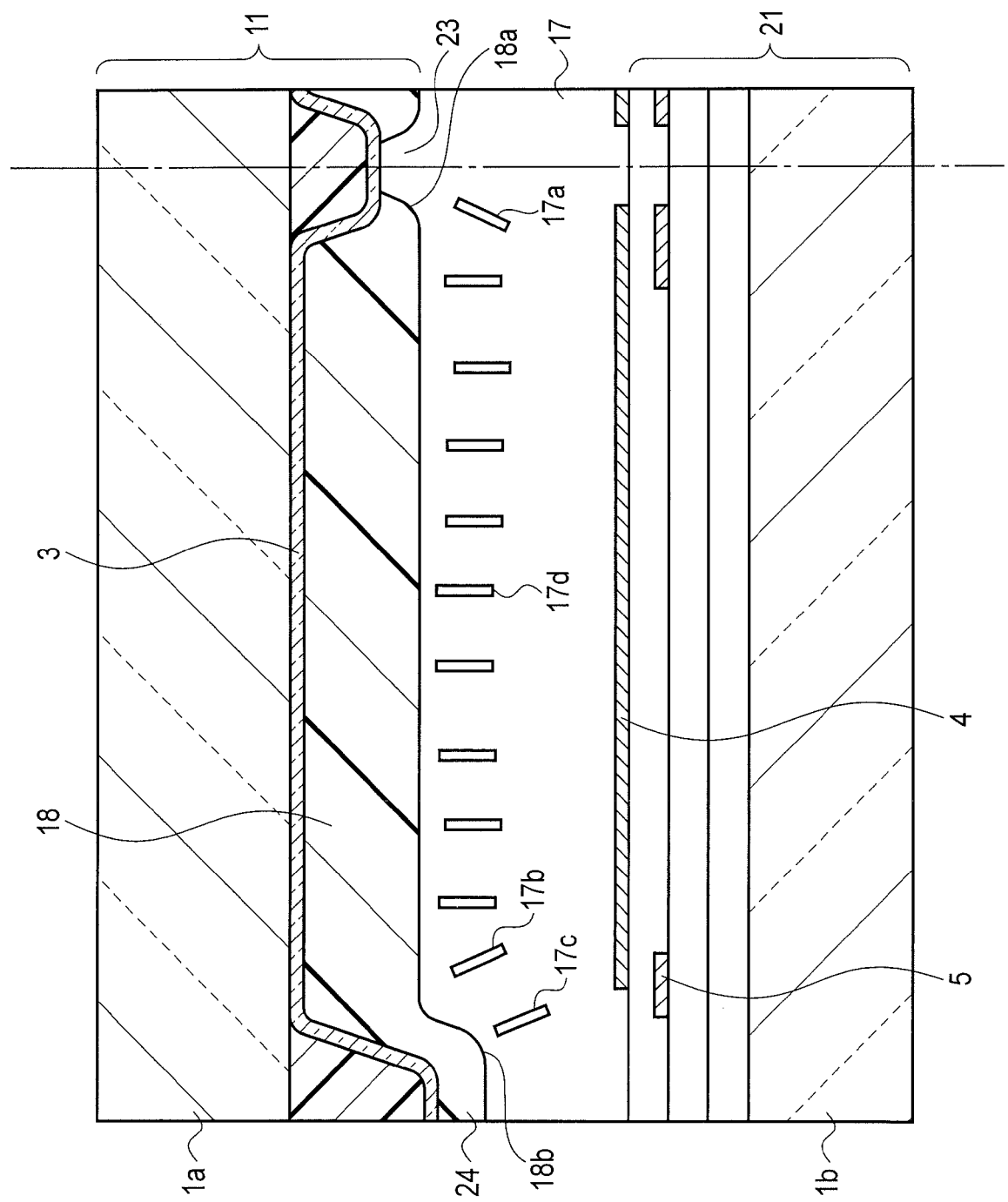
FIG. 7 is a view illustrating an alignment state that the liquid crystal molecules are aligned approximate perpendicularly to a plane of a substrate at the time of white display after the driving voltage is applied thereto.

FIG. 7 illustrates a state that the liquid crystal molecules are aligned at the time of white display after the driving-voltage applying. The liquid crystal molecules are aligned substantially vertically to the substrate plane.

The above has described the behavior of the liquid crystal molecules near the substrate 11 side. However, in a liquid crystal display device according to a different embodiment of the invention, at the array substrate 21 side also, liquid crystal molecules can be inclined in the same direction as at the above-mentioned substrate 11 side. Hereinafter, such an example will be described about a case where liquid crystals having negative dielectric constant anisotropy are used.

Figure 8:
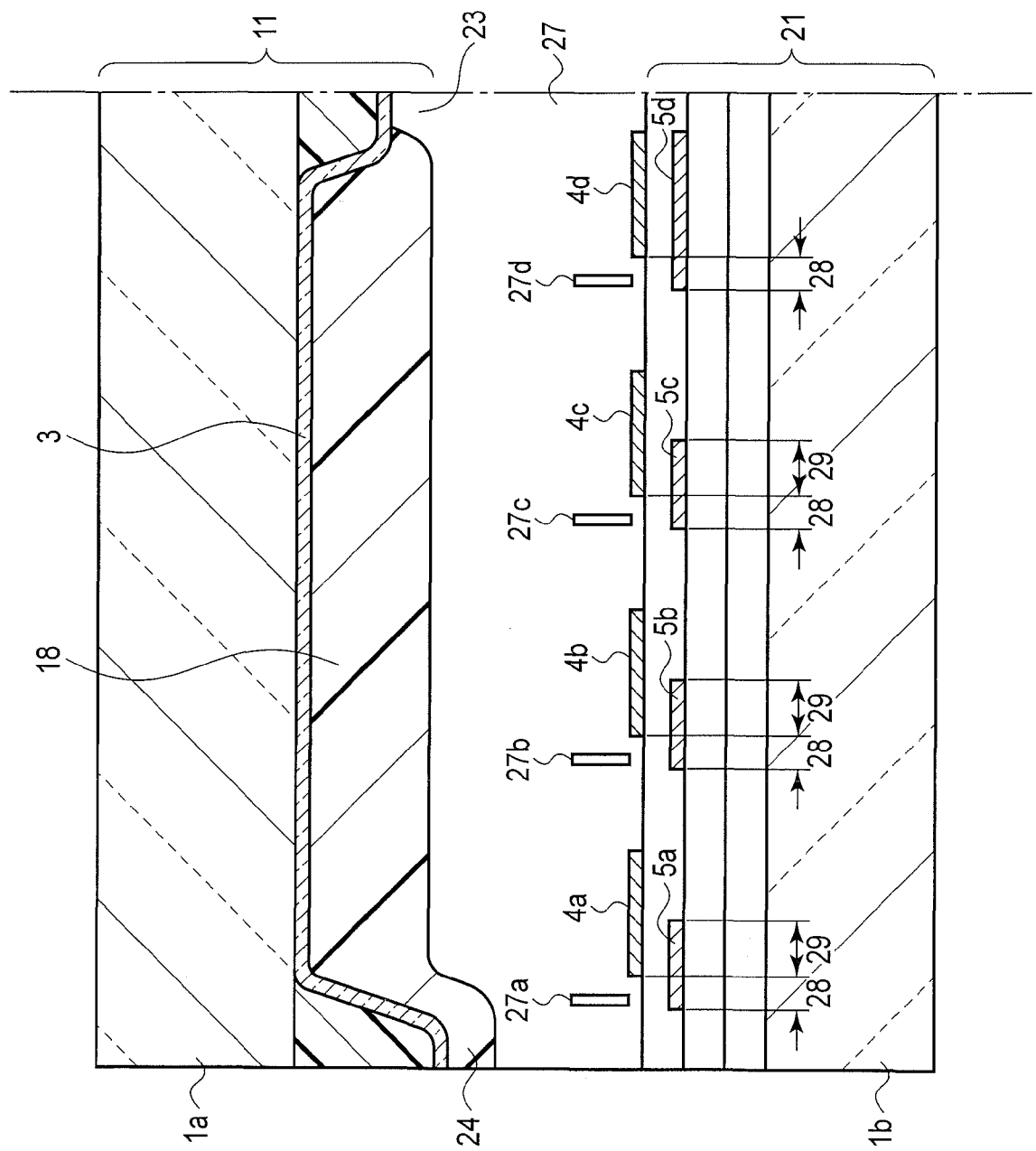
FIG. 8 is a view illustrating liquid crystal molecules aligned vertically near the first electrode when the first and second electrodes of the vertically aligned liquid crystal display device illustrated in FIG. 1 are each made into a comb-teeth-form pattern.

In a liquid crystal display device illustrated in FIG. 8, a first electrode includes comb-teeth-form electrodes 4a, 4b, 4c and 4d. Similarly, a second electrode includes comb-teeth-form electrodes 5a, 5b, 5c and 5d. Liquid crystal molecules 27a, 27b, 27c and 27d near the first electrode regions 4a, 4b, 4c and 4d are vertically aligned.

In the liquid crystal display device in FIG. 8, the second electrodes 5a, 5b, 5c and 5d are arranged in such a manner that ends thereof are protruded from respective ends of the first electrodes 4a, 4b, 4c and 4d in a direction from the pixel toward a black matrix 2, which is a direction in which the liquid crystal 27a is inclined. Respective quantities 28 of the protrusions can be adjusted into various values by a liquid crystal material to be used, the driving voltage, and the thickness of the liquid crystal cells and other dimensions. The protrusion quantities 28 are each sufficient even when the quantity 28 is a small quantity of 1 to 5 μm. The width of each of regions where the first electrode regions 4a, 4b, 4c and 4d overlap the second electrode regions 5a, 5b, 5c and 5d, respectively, is represented by reference number 29. Illustration of any alignment film is omitted. The respective widths of the overlapped regions can be appropriately adjusted.

Figure 9:
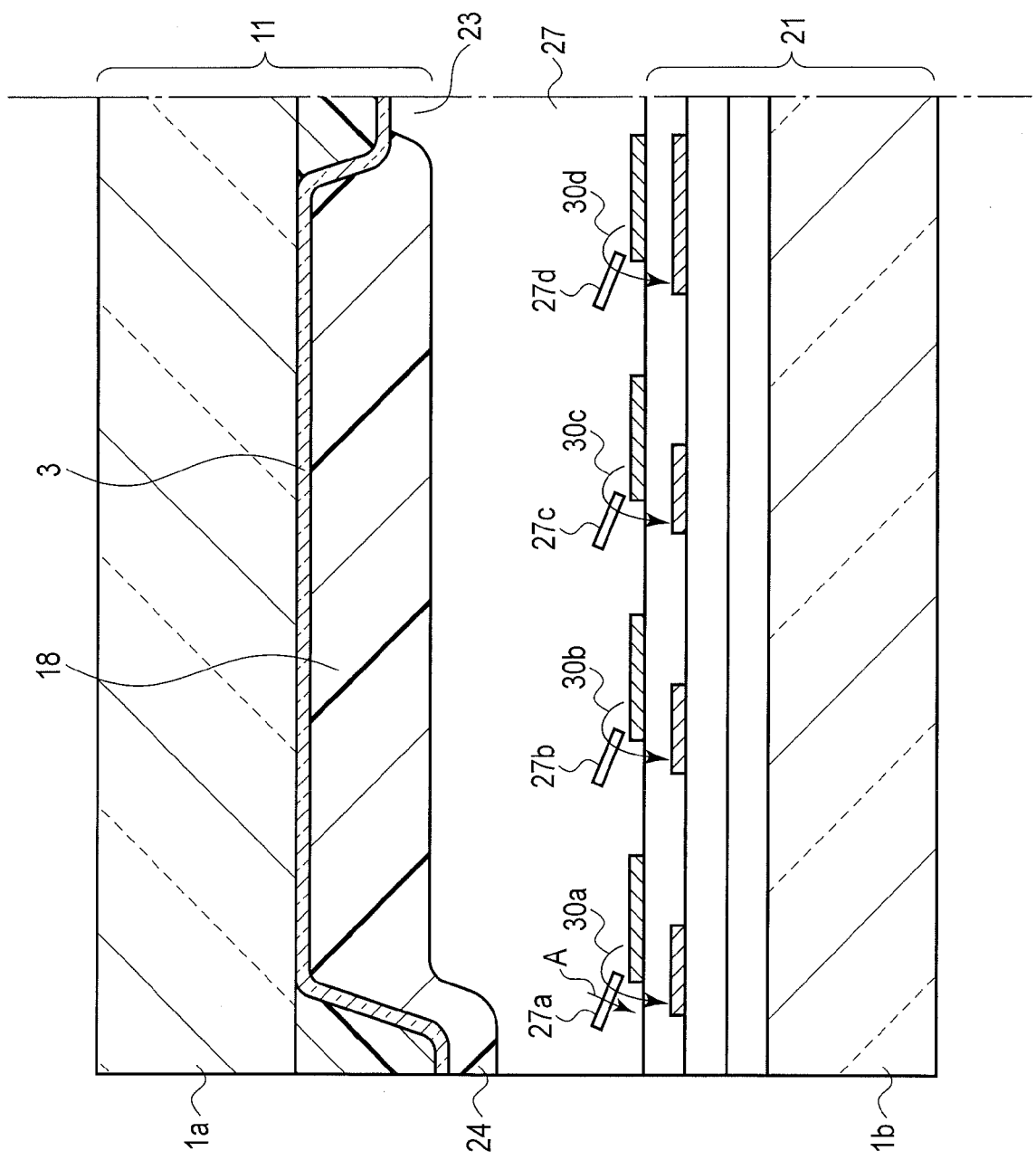
FIG. 9 is a view illustrating motions of liquid crystal molecules in the vertically aligned liquid crystal display device illustrated in FIG. 5, and electric lines of force just after a liquid-crystal-driving voltage is applied thereto.

FIG. 9 shows respective motions of the liquid crystal molecules 27a, 27b, 27c and 27d together with lines of electric force 30a, 30b, 30c and 30d just after a liquid-crystal-driving voltage is applied to the electrodes. The liquid crystal molecules 27a, 27b, 27c and 27d begin to be inclined into a direction A of the lines of electric force by the voltage applying. This direction in which the liquid crystal molecules are inclined is identical with the direction in which the liquid crystal molecules 17a, 17b and 17c illustrated in FIG. 3 are inclined; therefore, liquid crystal molecules in the illustrated pixel are instantaneously inclined in the same direction, so that the responses of the liquid crystals can be largely improved.

In order to orient the direction in which the liquid crystal molecules above protruded parts of the second electrodes 5a, 5b, 5c and 5d from respective ends of the first electrode regions 4a, 4b, 4c and 4d are inclined easily, the following examples of manners can be attained. Such examples include the manner of tapering the ends of the first electrodes, that of making the respective layer thicknesses of the first electrodes large; and that of etching an insulating layer below the first electrodes partially to make the thickness of an insulating layer above the second electrodes small. The liquid crystal molecules are thus slightly tilted so that the molecules are easily inclined even by effect of a low voltage.

FIG. 9 illustrates a ½ pixel of the pixel. Desirably, the direction in which the second electrodes are protruded in the other ½ pixel of the pixel is centrosymmetrical or linearly symmetrical with the ½ pixel in FIG. 9, and is a reverse direction. The pattern of each of the comb-teeth-form electrodes may be in the form of V shapes, or are inclined when viewed in plan. Alternatively, the comb-teeth-form patterns may have the comb-teeth directions of which are varied by 90° in the units of a ¼ pixel. Such an electrode patterns are desirably centrosymmetrical or linearly symmetrical about the center of the pixel.

When the pixel is a longitudinal rectangular pixel, it is preferred that the shape of a concave part 23 when viewed in plan is straight linear in a region passing through the center of the pixel, so that the line divides the rectangular pixel into two parts. However, in accordance with the respective comb-teeth pattern shapes of the first and second electrodes, the shape may be such a shape that the part 23 is extended into a cross form or X-shaped form from the center of the rectangular pixel. When the concave part is made into the cross form or X-shaped form, it is desired to arrange the protruded parts of the second electrodes into rectangular-pixel-four-side (or black-matrix) directions from the first electrodes. The comb-teeth pattern of the first electrodes and that of the second electrodes are each desirably centrosymmetrical or linearly symmetrical about the center of the rectangular pixel. When the liquid crystals are driven in the state that the pixel is divided, optical compensation can be completely attained to make it possible to obtain a vertically aligned liquid crystal display device having a wide visual field angle and giving no color change even when its display is viewed from any angle.

A voltage for driving the liquid crystals is applied to the first electrode. However, the second electrode and the third electrode may be made into a common potential. The overlapped part 29, where the first electrode and second electrode is overlapped, as illustrated in FIG. 8, may be used as an auxiliary capacitor.

In (each of the examples of) the embodiment illustrated in FIGS. 1 to 9, no color filter is formed to the substrate 11. However, a color filter may be formed to be the substrate to form a color filter substrate. In this case, the color filter is formed between the transparent electroconductive film 3 and the resin layer 18. Color pixels constituting the color filter are not limited to three color pixels of red pixels, green pixels, and blue pixels. A complementary color pixel, such as a yellow pixel, and/or a white pixel (a transparent pixel) may be added thereto.

Figure 10:
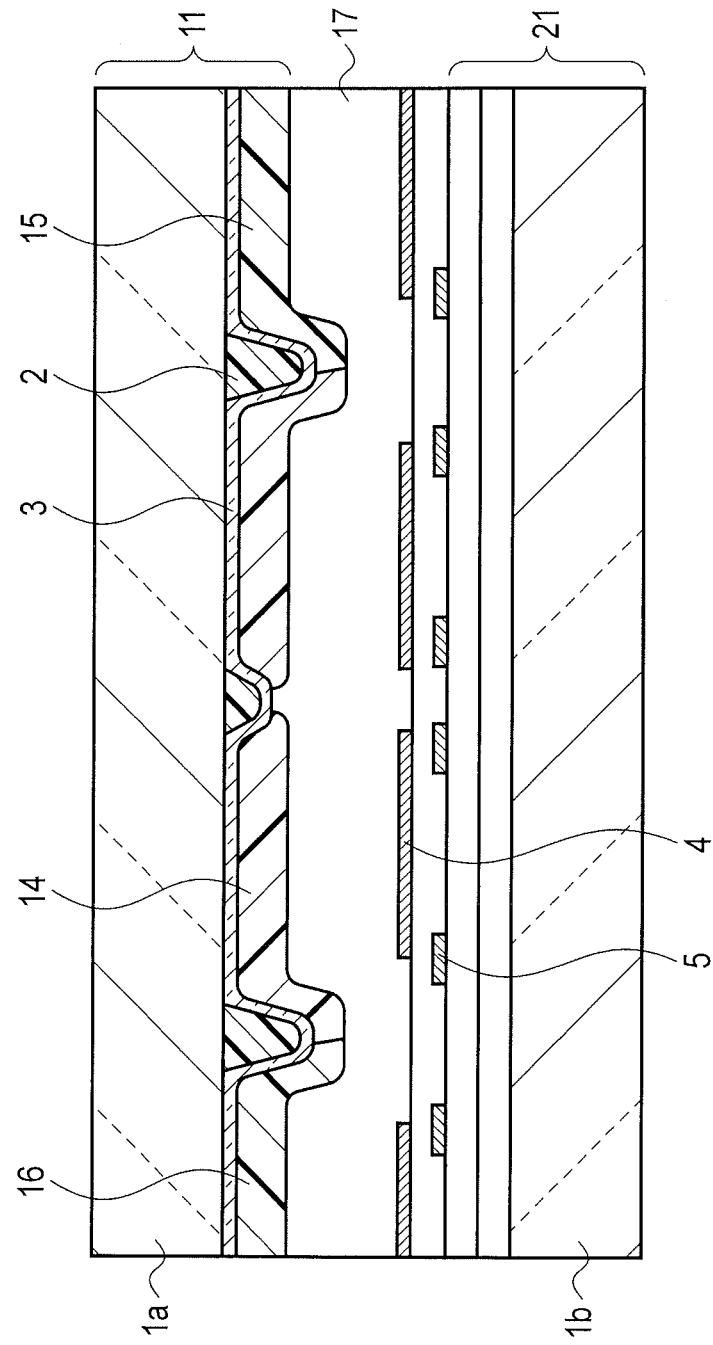
FIG. 10 is a schematic sectional view of a vertically aligned liquid crystal display device according to a second embodiment of the invention.

FIG. 10 is a schematic sectional view of a vertically aligned liquid crystal display device according to the second embodiment of the invention. This liquid crystal display device has a structure in which a color filter substrate (hereinafter referred to briefly as a color filter substrate) 11 and an array substrate 21 are stuck to each other in such a form that liquid crystals 17 is sandwiched therebetween. The color filter substrate 11 is formed by forming, onto a transparent substrate 1a, a black matrix 2, a third electrode 3 which is a transparent electroconductive film, each green pixel 14, each red pixel 15, and each blue pixel 16 successively. In the array substrate 21, second electrodes 4 and third electrodes 5 are formed above a transparent substrate 1b. Illustration of one or more protecting layers, alignment films, polarizing plates, and retardation films, and others is omitted.

Figure 11:
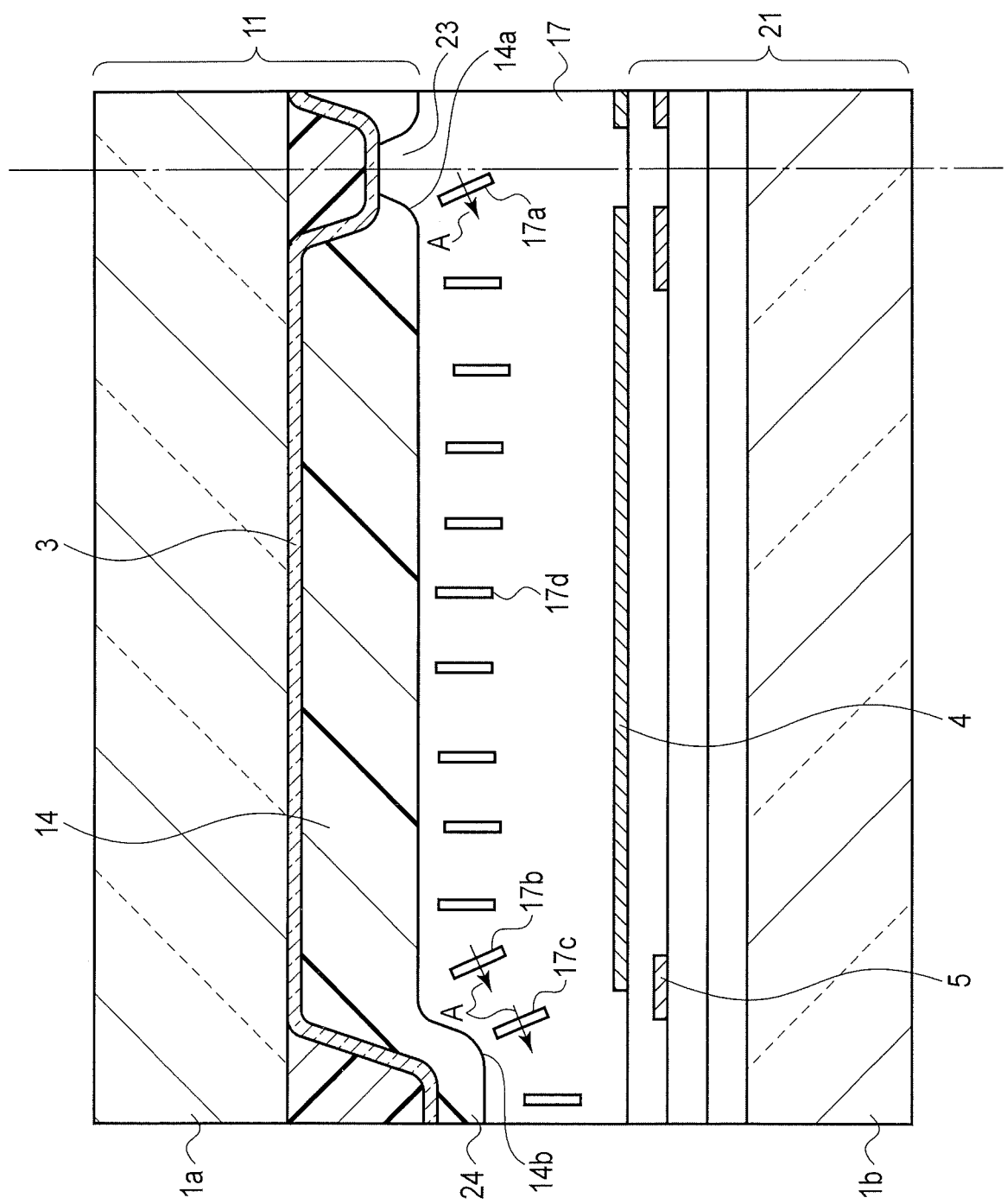
FIG. 11 is a sectional view illustrating, on an enlarged scale, a ½ region of a green pixel 14 in FIG. 10, which is a rectangular pixel when viewed in plan.

FIG. 11 is a sectional view illustrating, on an enlarged scale, a ½ region of the green pixel 14 in FIG. 10, this pixel being a rectangular pixel when viewed in plan. The polarizing plate is in a crossed Nichol form, and the liquid crystal display device is a normally black. FIG. 11 illustrates respective alignment states of liquid crystal molecules 17a, 17b, 17c and 17d in the liquid crystals 17 aligned vertically in the state that no voltage is applied to the third electrode 3, which is the transparent electroconductive film formed to the color filter substrate, and the first electrodes 4 and the second electrodes 5 formed to the array substrate 21.

The liquid crystals at the center of the green pixel 14 (½ pixel) are aligned vertically to the plane of the green pixel. However, the liquid crystal molecule 17a, which is at a shoulder part 14a of a concave part 23, and the molecules 17b and 17c, which are at a shoulder part 14b of a convex part 24, are somewhat obliquely aligned. When a liquid-crystal-driving voltage is applied to the electrodes in this obliquely aligned state, the liquid crystal molecules 17a, 17b and 17c are inclined into the direction of arrows A. The formation of the concave part 23 and the convex part 24 causes the liquid crystal molecules 17a, 17b and 17c to be substantially tilted without subjecting this liquid crystal device to an alignment treatment such as rubbing.

Figure 12:
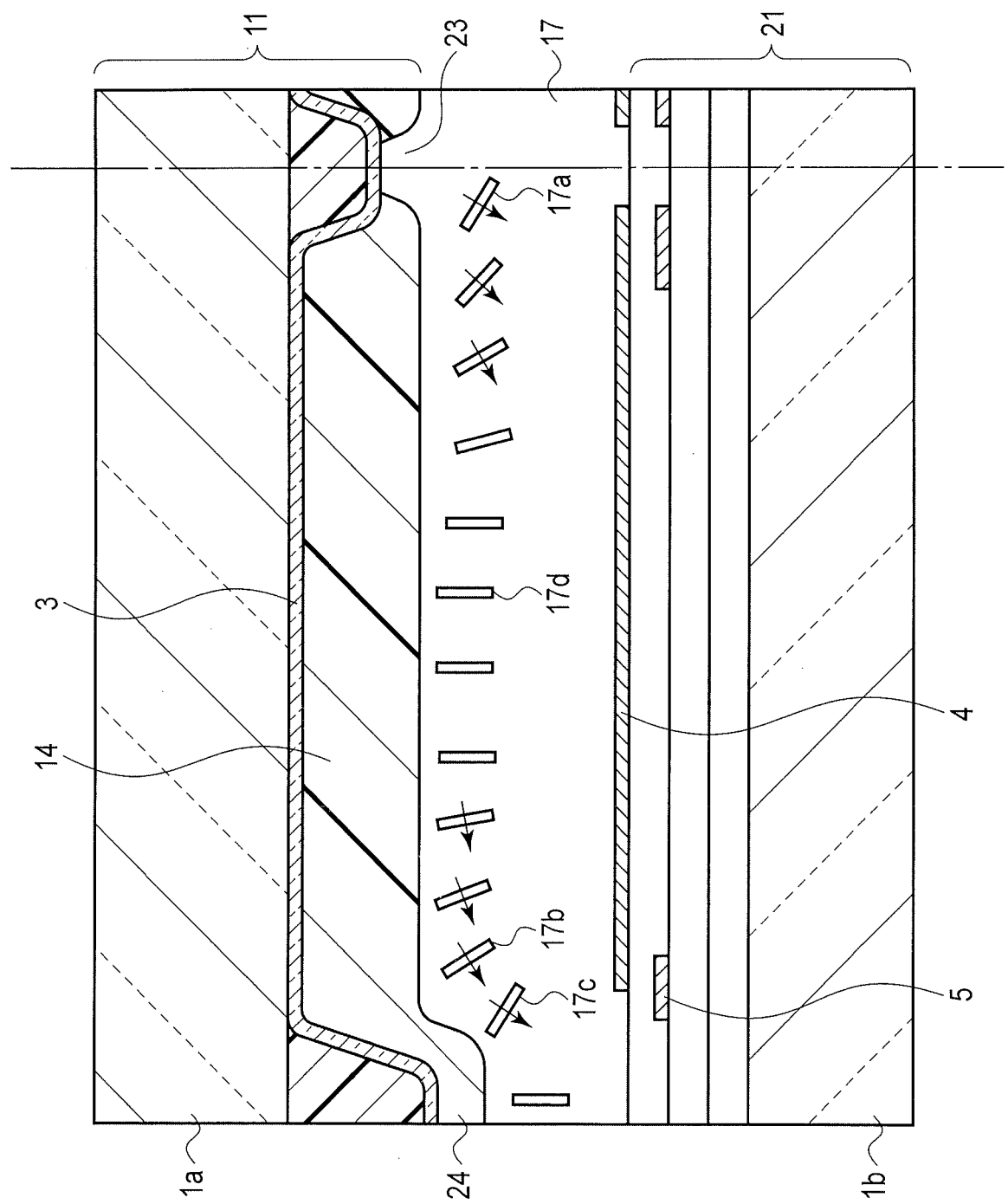
FIG. 12 is a view demonstrating motions of liquid crystals starting to be inclined in the liquid crystal display device illustrated in FIG. 10 just after a driving voltage is applied thereto.
Figure 13:
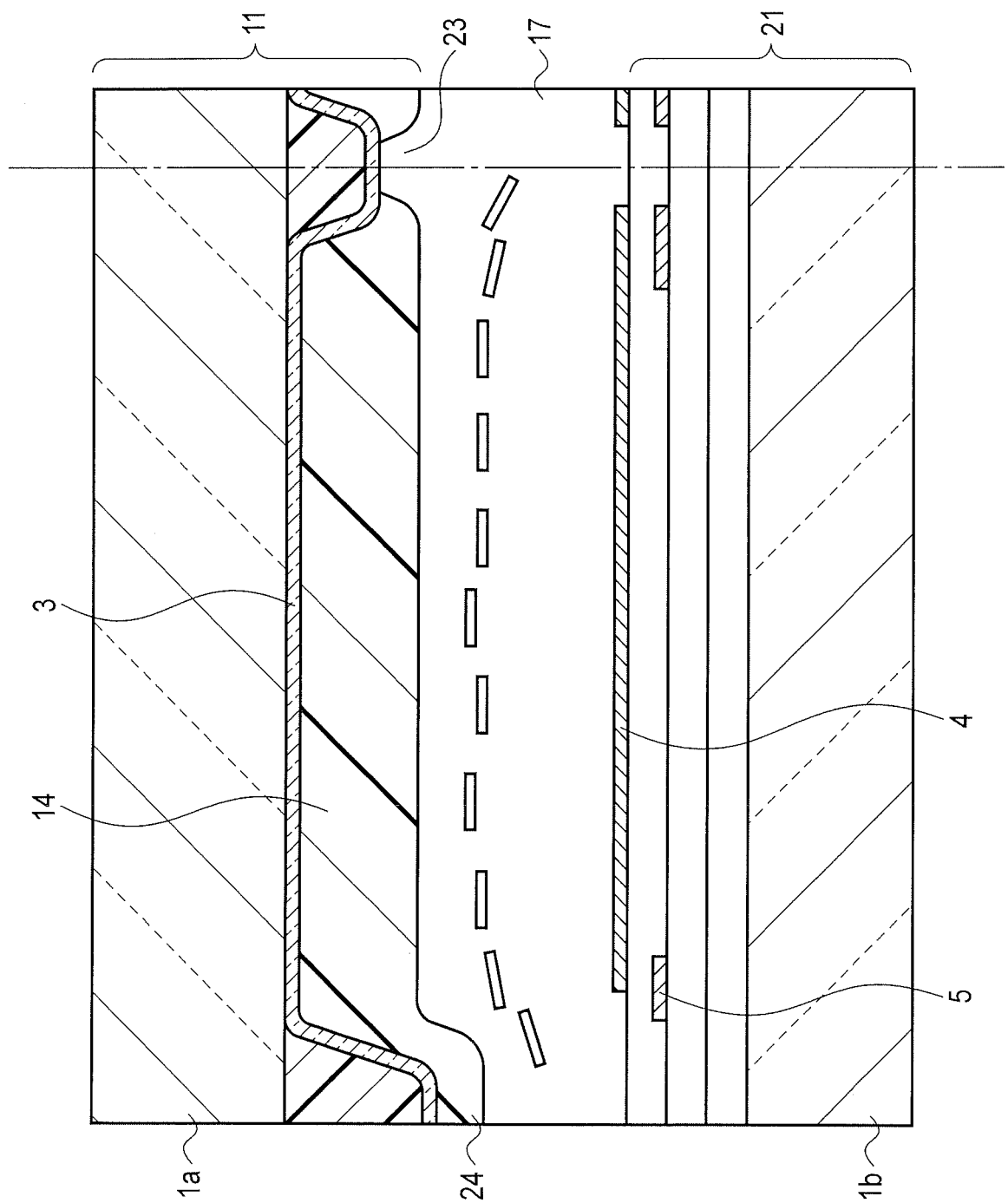
FIG. 13 is a view illustrating a state that the liquid crystal molecules in the liquid crystal display device illustrated in FIG. 10 are aligned at the time of white display after the driving voltage is applied thereto.

The motions of the liquid crystal molecules by the driving-voltage applying are illustrated in FIGS. 12 and 13. The motions are the same as illustrated in FIGS. 3 and 4.

Figure 14:
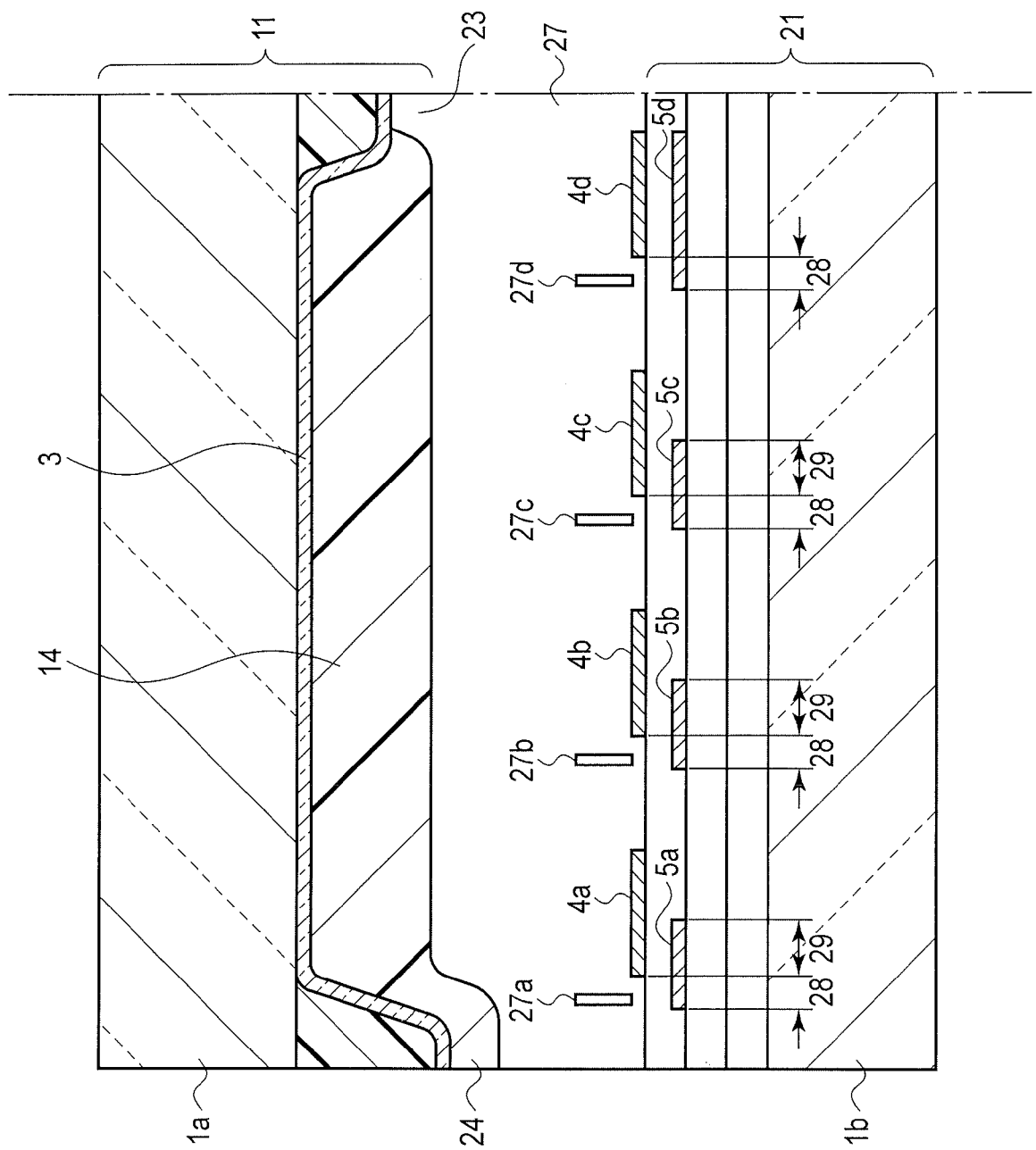
FIG. 14 is a view illustrating motions of the liquid crystal molecules at the array substrate side of the liquid crystal display device illustrated in FIG. 10 by effect of drive-voltage applying.
Figure 15:
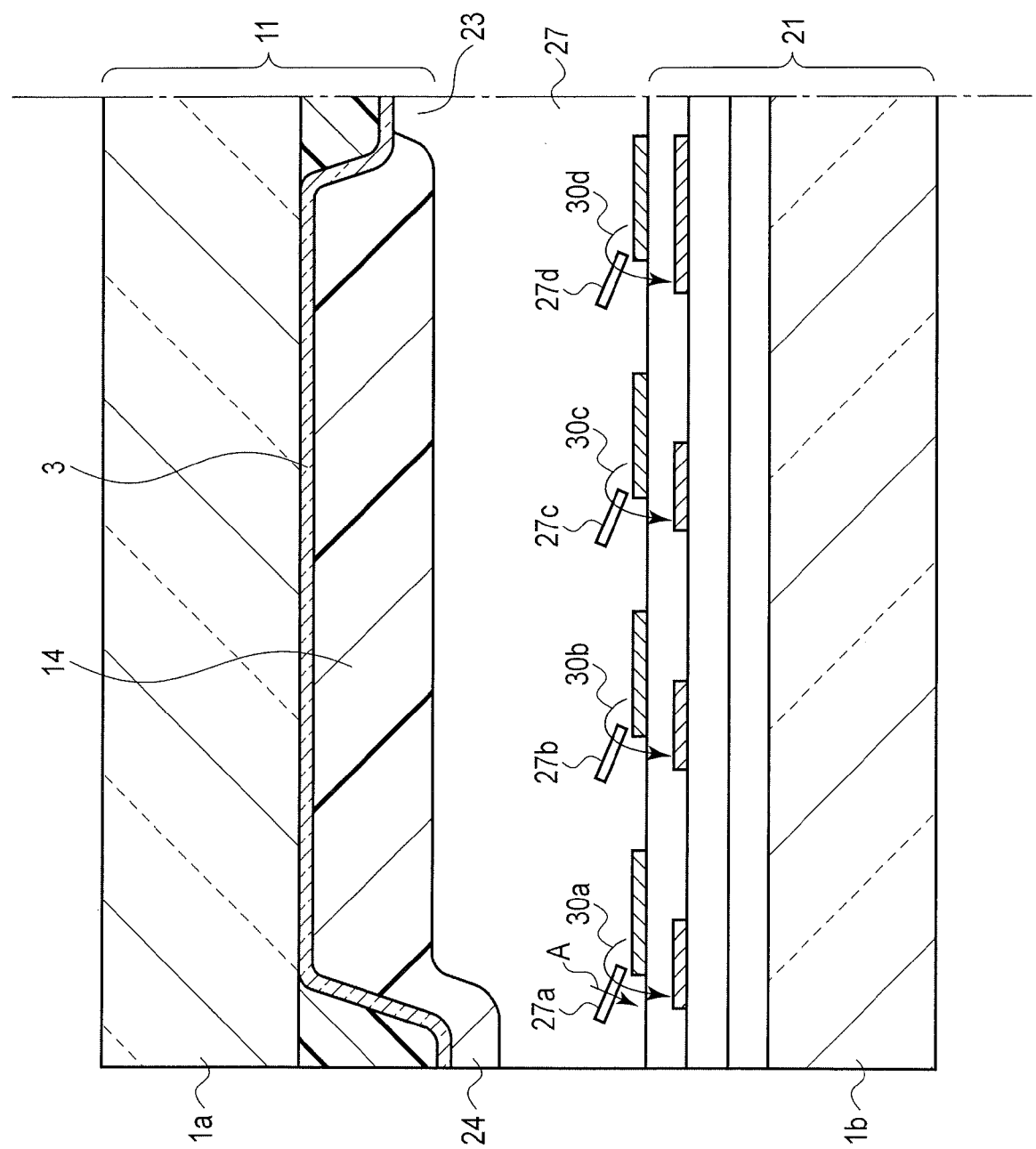
FIG. 15 is a view illustrating motions of the liquid crystal molecules at the array substrate side of the liquid crystal display device illustrated in FIG. 10 by effect of the driving-voltage applying.

The above has described the behavior of the liquid crystal molecules near the substrate 11 side. However, at the array substrate 21 side thereof also, liquid crystal molecules can be inclined in the same direction as at the above-mentioned substrate 11 side. Such an example is illustrated in FIGS. 14 and 15 about a case where liquid crystals having negative dielectric constant anisotropy are used. The motions of the liquid crystal molecules in this case are the same as in FIGS. 8 and 9.

When a TFT, which is an active element, is formed to be made of, for example, an oxide semiconductor, the aperture rate (numerical aperture) of its pixel can be improved. A typical example of the oxide semiconductor is a multi-oxide of indium, gallium and zinc, which is called IGZO.

Hereinafter, examples will be given about a transparent resin, organic pigments, and others that are usable in the liquid crystal display substrate according to the present embodiment.

(Transparent Resin)

A photosensitive coloring composition used in the formation of the light-shielding layer, the color layer, and the resin layer contains, besides a pigment dispersed substance, a polyfunctional monomer, photosensitive resin or non-photosensitive resin, a polymerization initiator, a solvent and others. Highly-transparent organic resins which are usable in the embodiment, such as photosensitive resin and non-photosensitive resin, are collectively referred to as a transparent resin.

Examples of the transparent resin include thermoplastic resin, thermosetting resin, and photosensitive resin. Examples of the thermoplastic resin include butyral resin, styrene/maleic acid copolymer, chlorinated polyethylene, chlorinated polypropylene, polyvinyl chloride, vinyl chloride/vinyl acetate copolymer, polyvinyl acetate, polyurethane resin, polyester resin, acrylic resin, alkyd resin, polystyrene resin, polyamide resin, rubbery resin, cyclic rubbery resin, celluloses, polybutadiene, polyethylene, polypropylene, polyimide resin, and the like. Examples of the thermosetting resin include epoxy resin, benzoguanamine resin, rosin-modified maleic acid resin, rosin-modified fumaric acid resin, melamine resin, urea resin, phenolic resins and the like. The thermosetting resin may be a resin obtained by causing melamine resin to react with a compound containing isocyanate groups.

(Alkali-Soluble Resin)

In order to form light-shielding layer, light scattering layer, color layer, transparent resin layer and cell gap regulating layer usable in the present embodiment, it is preferred to use a photosensitive resin composition which can be made into a pattern in a photolithographic manner. A resin therefor, which is transparent, is desirably a resin to which alkali-solubility is given. The alkali-soluble resin is not particularly limited as far as the resin is a resin containing a carboxyl group or a hydroxyl group. Examples thereof include epoxy acrylate resin, Novolak resin, polyvinyl phenol resin, acrylic resin, carboxyl-group-containing epoxy resin, carboxyl-group-containing urethane resin, and the like. Of these resins, preferred are epoxy acrylate resin, Novolak resin, and acrylic resin. Particularly preferred are epoxy acrylate resin, or Novolak resin.

(Acrylic Resin)

Typical examples of the transparent resin adoptable in the embodiment are acrylic resins described below.

The acrylic resins are each a polymer yielded by use of, for example, the following as a monomer: (meth)acrylic acid; an alkyl(meth)acrylate such as methyl(meth)acrylate, ethyl (meth)acrylate, propyl(meth)acrylate, butyl(meth)acrylate, t-butyl(meth)acrylate penzyl(meth)acrylate, lauryl(meth) acrylate, or the like; a hydroxyl-group-containing (meth) acrylate such as hydroxylethyl(meth)acrylate, hydroxylpropyl(meth)acrylate, or the like; an ether-group-containing (meth)acrylate such as ethoxyethyl(meth)acrylate, glycidyl (meth)acrylate, or the like; or an alicyclic(meth)acrylate such as cyclohexyl(meth)acrylate, isobornyl(meth)acrylate, dicyclopentenyl(meth)acrylate, or the like.

The above-mentioned monomers may be used alone or in combination of two or more thereof. The transparent resin may be a copolymer made from the monomer(s) and a compound which can be copolymerized therewith, such as styrene, cyclohexylmaleimide, or phenylmaleimide.

Moreover, a resin having photosensitivity can also be yielded by copolymerizing a carboxylic acid having an ethylenically unsaturated group, such as (meth)acrylic acid, therewith, and then causing the resultant copolymer to react with a compound having an epoxy group and an unsaturated double bond, such as glycidyl methacrylate, or by adding a carboxylic-acid-containing compound such as (meth)acrylic acid to a polymer made from an epoxy-group-containing (meth)acrylate, such as glycidyl methacrylate, or to a copolymer made from this polymer and a different (meth)acrylate.

Furthermore, a resin having photosensitivity can also be yielded by causing a hydroxyl-group-containing polymer made from a monomer such as hydroxyethyl methacrylate to react with a compound having an isocyanate group and an ethylenically unsaturated bond, such as methacryloyloxyethyl isocyanate.

As described above, a carboxyl-group-containing resin can be yielded by causing a copolymer made from hydroxyethyl methacrylate having plural hydroxyl groups, or other monomer, to react with a polybasic acid anhydride to introduce carboxyl groups to the copolymer. The method for producing the carboxyl-group-containing resin is not limited to only this method.

Examples of the acid anhydride used in this reaction include maloic anhydride, succinic anhydride, maleic anhydride, itaconic anhydride, phthalic anhydride, tetrahydrophthalic anhydride, hexahydrophthalic anhydride, methyltetrahydrophthalic anhydride, and trimellitic anhydride.

The acid value of the solid content in each of the above-mentioned acrylic resins is preferably from 20 to 180 mgKOH/g. If the acid value is less than 20 mgKOH/g, the photosensitive resin composition is too small in development rate so that a time required for the development thereof becomes long. As a result, the substrate of the embodiment tends to be poor in productivity. If the acid value in the solid content is larger than 180 mgKOH/g, the composition is reversely too large in development rate. Thus, an inconvenience that after the development the pattern is peeled or chipped tends to be caused.

When the above-mentioned acrylic resins each have photosensitivity, the double bond equivalent of the acrylic resin is preferably 100 or more, more preferably from 100 to 2000, most preferably from 100 to 1000. If the double bond equivalent is more than 2000, the resin composition may not gain a sufficient photo-curability.

(Photopolymerizable Monomer)

Examples of the photopolymerizable monomer include various acrylates and methacrylates such as 2-hydroxyethyl (meth)acrylate, 2-hydroxypropyl(meth)acrylate, cyclohexyl (meth)acrylate, polyethylene glycol di(meth)acrylate, pentaerythritol tri(meth)acrylate, trimethylolpropane tri(meth)acrylate, dipentaerythritol hexa(meth)acrylate, tricyclodecanyl(meth)acrylate, melamine(meth)acrylate, epoxy(meth)acrylate or the like, (meth)acrylic acid, styrene, vinyl acetate, (meth)acrylamide, N-hydroxymethyl(meth) acrylamide, acrylonitrile or the like.

It is also preferred to use a polyfunctional urethane acrylate having a (meth)acryloyl group, which is yielded by causing a polyfunctional isocyanate to react with a (meth)acrylate having a hydroxyl group. The combination of the (meth)acrylate having a hydroxyl group with the polyfunctional isocyanate is any combination, and is not particularly limited. About the polyfunctional urethane isocyanate, a single species thereof may be used alone, or two or more species thereof may be used in combination.

(Photopolymerization Initiator)

Examples of the photopolymerization initiator include acetophenone compounds such as 4-phenoxydichloroacetophenone, 4-t-butyl-dichloroacetophenone, diethoxyacetophenone, 1-(4-isopropylphenyl)-2-hydroxy-2-methylpropane-1-one, 1-hydroxycyclohexyl phenyl ketone, and 2-benzyl-2-dimethylamino-1-(4-morpholinophenyl)-butane-1-one; benzoin compounds such as benzoin, benzoin methyl ether, benzoin ethyl ether, benzoin isopropyl ether, and benzyl dimethyl ketal; benzophenone compounds such as benzophenone, benzoylbenzoic acid, methyl benzoylbenzoate, 4-phenylbenzophenone, hydroxybenzophenone, acrylated benzophenone, 4-benzoyl-4'-methyldiphenylsulfide; thioxanthone compounds such as thioxanthone, 2-chlorothioxanthone, 2-methylthioxanthone, isopropylthioxanthone, and 2,4-diisopropylthioxanthone; triazine compounds such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl s-triazine, 2-(naphtho)-1-yl)-4,6-bis(chloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl(4'-methoxystyryl)-6-triazine; oxime ester compounds such as 1,2-octanedione, 1-[4-(phenylthio)-, 2-(O-benzoyloxime)], and O-(acetyl)-N-(1-phenyl-2-oxo-2-(4'-methoxy-naphthyl) ethylidene)hydroxylamine; phosphine compounds such as bis(2,4,6-trimethylbenzoyl)phenylphosphine oxide, and 2,4,6-trimethylbenzoyldiphenylphosphine oxide; quinone compounds such as 9,10-phenanthrenequinone, camphorquinone, and ethylanthraquinone; borate compounds; carbazole compounds; imidazole compounds; and thitanocene compounds. An oxime derivative (oxime compound) is effective for improving the resin composition in sensitivity. These may be used alone or in combination of two or more thereof.

(Photosensitizer)

It is preferred to use a photosensitizer together with the photopolymerization initiator. As the photosensitizer, the following may be used together: α-acyloxyester, acylphosphine oxide, methylphenyl glyoxylate, benzyl-9,10-phenanthrenequinone, camphorquinone, ethylanthraquinone, 4,4'-diethylisophthalophenone, 3,3',4,4'-tetra(t-butylperoxycarbonyl) benzophenone, 4,4'-diethylaminobenzophenone, or other compound.

The photosensitizer may be incorporated in an amount of 0.1 to 60 parts by mass for 100 parts by mass of the photopolymerization initiator.

(Ethylenically Unsaturated Compound)

It is preferred to use the photopolymerization initiator together with an ethylenically unsaturated compound. The ethylenically unsaturated compound means a compound having, in the molecule thereof, one or more ethylenically unsaturated bonds. Of such compounds, preferred is a compound having, in the molecule thereof, two or more ethylenically unsaturated bonds because the compound in polymerizability and crosslinkability are improved, and the difference in developer-solubility between exposed parts and unexposed parts accompanying the polymerizability and crosslinkability is distinct. Particularly preferred is a (meth)acrylate compound having an unsaturated bond originating from a (meth) acryloyloxy group.

Examples of the compound having, in the molecule thereof, one or more ethylenically unsaturated bonds include unsaturated carboxylic acids, such as (meth)acrylic acid, crotonic acid, isocrotonic acid, maleic acid, itaconic acid and citraconic acid, and alkyl esters thereof; (meth)acrylonitrile; (meth)acrylamide; and styrene. Typical examples of the compound having, in the molecule thereof, two or more ethylenically unsaturated bonds include esters each made from an unsaturated carboxylic acid and a polyhydroxy compound; (meth)acryloyloxy-group-containing phosphates; urethane (meth)acrylates each made from a hydroxyl(meth)acrylate compound and a polyisocyanate compound; and epoxy (meth)acrylates each made from (meth)acrylic acid or a hydroxyl(meth)acrylate compound, and a polyepoxy compound.

The above-mentioned photopolymerization initiator, photosensitizer, and ethylenically unsaturated compound may be added to a composition which contains a polymerizable liquid crystal compound and which is used to form a retardation layer that will be described later.

(Polyfunctional Thiol)

A polyfunctional thiol, which functions as a chain transfer agent, may be incorporated into the photosensitive colored composition. The polyfunctional thiol needs only to be a compound having two or more thiol groups. Examples thereof include hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, tris(2-hydroxyethyl)trimercaptopropionate isocyanurate, 1,4-dimethylmercaptobenzene, 2,4,6-trimercapto-s-triazine, and 2-(N,N-dibutylamino)-4,6-dimercapto-s-triazine.

These polyfunctional thiol compounds may be used alone or in the form of a mixture of two or more thereof. The polyfunctional thiol may be used, in the photosensitive colored composition, in an amount ranging preferably from 0.2 to 150 parts by mass, more preferably from 0.2 to 100 parts by mass for 100 parts by mass of its pigment.

(Storage Stabilizer)

A storage stabilizer may be incorporated into the photosensitive color composition to stabilize the composition about viscosity over time. Examples of the storage stabilizer include quaternary ammonium chlorides, such as benzyltrimethylchloride, and diethylhydroxyamine; organic acids, such as lactic acid and oxalic acid, and methyl ethers thereof; t-butylpyrocatechol; organic phosphines, such as triethylphosphine, and triphenylphosphine; and phosphites. The storage stabilizer may be incorporated into the photosensitive color composition in an amount of 0.1 to 10 parts by mass for 100 parts by mass of the pigment therein.

(Tackifier)

A tackifier (adhesiveness improver), such as a silane coupling agent, may be incorporated into the photosensitive color composition to make the composition high in adhesiveness to a substrate. Examples of the silane coupling agent include vinylsilanes such as vinyltris(β-methoxyethoxy)silane, vinylethoxysilane, and vinylmethoxysilane; (meth)acrylsilanes such as γ-methacryloxypropyltrimethoxysilane; epoxysilanes such as β-(3,4-epoxycyclohexyl)ethyltrimethoxysilane, β-(3,4-epoxycyclohexyl)methyltrimethoxysilane, 8-(3,4-epoxycyclohexyl)ethyltriethoxysilane, β-(3,4-epoxycyclohexyl)methyltriethoxysilane, γ-glycidoxypropyltrimethoxysilane, and γ-glycidoxypropyltriethoxysilane; aminosilanes such as N-β(aminoethyl)γ-aminopropyltrimethoxysilane, N-β(aminoethyl)γ-aminopropyltriethoxysilane, N-β(aminoethyl)γ-aminopropylmethyldiethoxysilane, γ-aminopropyltriethoxysilane, γ-aminopropyltrimethoxysilane, N-phenyl-γ-aminopropyltrimethoxysilane, and N-phenyl-γ-aminopropyltriethoxysilane; thiosilanes such as γ-mercaptopropyltrimethoxysilane, and γ-mercaptopropyltriethoxysilane. The silane coupling agent may be incorporated into the photosensitive colored composition in an amount of 0.01 to 100 parts by mass for 100 parts by mass of the pigment therein.

(Solvent)

A solvent such as water or an organic solvent may be blended with the photosensitive color composition to make the composition coatable evenly onto a substrate. When the composition used in the embodiment is for a color layer of a color filter, the solvent also has a function that disperses pigments evenly. Examples of the solvent include cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl-n amyl ketone, propylene glycol monomethyl ether, toluene, methyl ethyl ketone, ethyl acetate, methanol, ethanol, isopropyl alcohol, butanol, isobutyl ketone, and petroleum-based solvents. These may be used alone or in the form of a mixture. The solvent may be incorporated into the colored composition in an amount ranging from 800 to 4000 parts by mass, preferably from 1000 to 2500 parts by mass for 100 parts by mass of the pigment therein.

(Organic Pigments)

Usable examples of the pigment that is a red pigment include C.I. Pigment Reds 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272, and 279.

Usable examples of the pigment that is a yellow pigment include C.I. Pigment Yellows 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213 and 214.

Usable examples of the pigment that is a blue pigment include C.I. Pigment Blues 15, 15:1, 15:2, 15:3, 15:4, 15:6, 16, 22, 60, 64, and 80. Of these pigments, C.I. Pigment Blue 15:6 is preferred.

Usable examples of the pigment that is a violet pigment include C.I. Pigment Violets 1, 19, 23, 27, 29, 30, 32, 37, 40, 42, and 50. Of these pigments, C.I. Pigment Violet 23 is preferred.

Usable examples of the pigment that is a green pigment include C.I. Pigment Greens 1, 2, 4, 7, 8, 10, 13, 14, 15, 17, 18, 19, 26, 36, 45, 48, 50, 51, 54, 55 and 58. Of these pigments, C.I. Pigment Green 58 is preferred.

Hereinafter, in the description of pigment species of C.I. Pigments, the species may be abbreviated and described as follows: PB (Pigment Blue), PV (Pigment Violet), PR (Pigment Red), PY (Pigment Yellow), PG (Pigment Green), and the like.

(Coloring Material of Light-Shielding Layer)

A light-shielding color material contained in the light-shielding layer or the black matrix is a coloring material having an absorption in the range of visible ray wavelengths to show a light-shielding function. Examples of the light-shielding coloring material in the embodiment include organic pigments, inorganic pigments, and dyes. Examples of the inorganic pigments include carbon black, and titanium oxide. Examples of the dyes include azo dyes, anthraquinone dyes, phthalocyanine dyes, quinoneimine dyes, quinoline dyes, nitro dyes, carbonyl dyes, and methine dyes. The organic pigments may be the above-mentioned organic pigments. About the light-shielding component, a single species thereof may be used, or any combination of two or more species thereof may be used at any ratio therebetween. It is also allowable to coat the resin with the surface of such a coloring material, whereby the light-shielding color material is made higher in volume resistance, or reversely, raise the content by percentage of the coloring material in the base material of the resin to give some quantity of electroconductivity thereto, whereby the light-shielding color material is made lower in volume resistance. However, the volume resistivity of such the light-shielding material ranges from about $1\times10^8$ to $1\times10^{15}$ Ωcm; thus, the resistivity is not at a level that influences the resistance value of the transparent electroconductive film. Similarly, the dielectric constant of the light-shielding layer can be adjusted into the range of 3 to 11 by the selection of the coloring material, or the content by percentage thereof.

(Dispersing Agent and Dispersing Aid)

When a polymeric dispersing agent is used as a dispersing agent for the pigments, the pigments favorably becomes excellent in dispersion stability over time. Examples of the polymeric dispersing agent include urethane dispersing agents, polyethyleneimine dispersing agents, polyoxyethylene alkyl ether dispersing agents, polyoxyethylene glycol diester dispersing agents, sorbitan aliphatic ester dispersing agents, and aliphatic-compound-modified polyester dispersing agents. Particularly preferred is a dispersing agent made of a graft copolymer containing nitrogen atoms for a light-shielding photosensitive resin composition used in the embodiment and containing a large amount of the pigments from the viewpoint of the developability thereof.

Specific examples of these dispersing agents include EFKA (manufactured by EFKA Co.), Disperbik (manufactured by BYK Japan K.K.), DISPARLON (manufactured by Kusumoto Chemicals, Ltd.), SOLSPERSE (manufactured by The Lubrizol Corporation), KP (manufactured by Shin-Etsu Chemical Co., Ltd.), and POLYFLOW (manufactured by KYOEISHA CHEMICAL Co., LTD.), which are each a trade name. These dispersing agents may be used alone, or may be used in any combination of two or more thereof at any ratio therebetween.

An aid for the dispersion may be, for example, a colorant derivative. Examples thereof include azo type, phthalocyanine type, quinacridon type, benzimidazolone type, quinophthalone type, isoindolinone type, dioxazine type, anthraquinone type, indanthrene type, perylene type, perynone type, diketopyrrolopyrrole type, and dioxazine type derivatives. Of these derivatives, quinophthalone type derivatives are preferred.

A substituent of the colorant derivatives is, for example, a sulfonic acid group, a sulfonamide group or a quaternary salt thereof, a phthalimidemethyl group, a dialkylaminoalkyl group, a hydroxyl group, a carboxyl group, or an amide group that is bonded directly or through an alkyl, aryl or heterocyclic group, or other group to the skeleton of the pigment. Of these groups, a sulfonic acid group is preferred. Two or more of substituents may be bonded to a single pigment skeleton.

Specific examples of the colorant derivatives include sulfonic acid derivatives of phthalocyanine, sulfonic acid derivatives of quinophthalone, sulfonic acid derivatives of anthraquinone, sulfonic acid derivatives of quinacridon, sulfonic acid derivatives of diketopyrrole, and sulfonic acid derivatives of dioxazine.

The above-mentioned dispersing aids and colorant derivatives may be used alone, or in any combination of two or more thereof at any ratio therebetween.

Hereinafter, various examples of the invention will be described.

In Examples 6 to 9 each related to a color filter substrate, out of the examples, for each of its color pixels, three colors of pixels, a red pixel, a green pixel and a blue pixel, were used. However, a complementary color pixel, such as a yellow pixel, or a white pixel may be added thereto.

EXAMPLE 1

A substrate illustrated in FIG. 16 was produced as follows:
(Black-Matrix-Forming Disperse Liquid)

In a bead mill dispersing machine were stirred 20 parts by mass of a carbon pigment #47 (manufactured by Mitsubishi Chemical Corporation), 8.3 parts by mass of a polymeric dispersing agent BYK-182 (manufactured by BYK Japan K.K.), and 1.0 part by mass of a copper phthalocyanine derivative (manufactured by TOYO INK CO., LTD.), and 71 parts by mass of propylene glycol monomethyl ether acetate to prepare a carbon black disperse liquid.
(Black-Matrix-Forming Photoresist)

A black-matrix-forming resist was formed, using the following materials:

carbon black disperse liquid: pigment #47 (manufactured by Mitsubishi Chemical Corporation),
resin: V259-ME (manufactured by Nippon Steel Chemical Co., Ltd.) (solid content by percentage: 56.1% by mass),
monomer: DPHA (manufactured by Nippon Kayaku Co., Ltd.),
initiators: OXE-02 (manufactured by Ciba Specialty Chemicals K.K.), and
OXE-01 (manufactured by Ciba Specialty Chemicals K.K.),
solvents: propylene glycol monomethyl ether acetate, and ethyl 3-ethoxypropionate, and
leveling agent: BYK-330 (manufactured by BYK Japan K.K.)

These materials were mixed with each other and stirred at composition proportions described below to prepare a black-matrix-forming resist (pigment concentration in the solid content: about 20%).

| | |
|---|---|
| Carbon black disperse liquid | 3.0 parts by mass |
| Resin | 1.4 parts by mass |
| Monomer | 0.3 part by mass |
| Initiator OXE-01 | 0.67 part by mass |
| Initiator OXE-02 | 0.17 part by mass |
| Propylene glycol monomethyl ether acetate | 14 parts by mass |
| Ethyl 3-ethoxypropionate | 5.0 parts by mass |
| Leveling agent | 1.5 parts by mass |

(Black-Matrix-Forming Conditions)

As illustrated in FIG. 16, the above-mentioned photoresist was applied onto a transparent substrate 1a made of glass by spin coating, and a workpiece was dried to form a coating film having a film thickness of 1.9 µm. This coating film was dried at 100° C. for 3 minutes, and then an exposure photomask having openings of a pattern width of 20.5 µm (corresponding to a streak width of a black matrix) was used for (the formation of) the black matrix to radiate light from a super-high-pressure mercury lamp as a light source at 200 mJ/cm$^2$.

Next, the workpiece was developed with a 2.5% solution of sodium carbonate for 60 seconds, sufficiently washed after the development, and further dried. Thereafter, the workpiece was subjected to heating treatment at 230° C. for 60 minutes to fix the pattern, thereby forming a black matrix 2, which is the black matrix, on the transparent substrate 1a. The streak width of the black matrix 2 was about 20 μm, and the black matrix was formed surrounding (four-sides) each rectangular pixel. The inclination angle of an end of each streak from the transparent substrate plane was set to about 45 degrees.
(Transparent Electroconductive Film Deposition)

A sputtering machine was used to form a film thickness of 0.14 μm of transparent electroconductive film 3 (third electrode) made of ITO (metal-oxide thin film of indium tin) to cover the entire front surface of the black matrix 2.
(Resin Layer Formation)

A coating liquid of an alkali-soluble acryl photosensitive resin was used to form a resin layer 18 to cover the transparent electroconductive film 3 by photolithography in such a manner that the film thickness of the layer 18 would be 1.8 μm after the resin turned into a hard film. A photomask used therein was a mask in which a slit of a half-tone (transflective region low in transmittance) was made for the center of each of the rectangular pixels. In this way, a linear concave part 13 in the form of a rectangle when viewed in plane was formed therein. The depth of the concave part 13 was set to about 1 μm.

The height $H_1$ of convex parts 24 formed above the black matrix 2 and made of the resin layer 18 was about 1.1 μm. The inclination of the convex parts 24 had an angle of about 45 degrees from the transparent substrate plane. The height $H_1$ of the convex parts 24 was defined as the height from the front surface of a flat part of the resin layer 18 to the top of the convex parts 24.

The substrate according to the present example included no color filter. A color filter may be formed on the array substrate side (of a display device using this substrate). Alternatively, the substrate may be applied to a color liquid crystal display device in a field sequential mode (mode of using plural LED light sources as a backlight, and attaining a color display, without using any color filter, by time-sharing light-source-driving).

The acrylic photosensitive resin coating liquid used to form the resin layer 18 was a transparent resin coating liquid yielded by synthesizing an acrylic resin as described below, further adding a monomer and a photoinitiator thereto, and then filtrating of 0.5 μm.
(Acrylic Resin Synthesis)

Into a reactor were put 800 parts by mass of cyclohexanone. While nitrogen gas was injected thereinto, the reactor was heated. Thereto was dropwise added a mixture of the following monomers and thermopolymerization initiator to conduct a polymerization reaction:

| | |
|---|---|
| styrene | 55 parts by mass, |
| methacrylic acid | 65 parts by mass, |
| methyl methacrylate | 65 parts by mass, |
| benzyl methacrylate | 60 parts by mass, |
| thermopolymerization initiator | 15 parts by mass, and |
| chain transfer agent | 3 parts by mass |

After the addition, the reactor was sufficiently heated, and thereto was added a solution yielded by dissolving 2.0 parts by mass of a thermopolymerization initiator into 50 parts by mass of cyclohexanone. The reaction further continued and a solution of an acrylic resin was yielded. Cyclohexanone was added to this resin solution to give a solid content by percentage of 30% by mass to prepare an acrylic resin solution: This was named a resin solution (1). The weight-average molecular weight of the acrylic resin was about 20,000.

Furthermore, a mixture including the following composition was stirred and mixed into an even state; and then glass beads having a diameter of 1 mm were used to disperse the composition in a sand mill for 2 hours, and the resultant was then filtrated through a filter with a mesh of 0.5 μm to yield a transparent resin coating liquid:

| | |
|---|---|
| resin solution (1) | 100 parts by mass, |
| polyfucnitonal polymerizable monomer EO-modified bisphenol A methacrylate (BPE-500, manufactured by Shin-Nakamura Chemical Co., Ltd.) | 20 parts by mass, |
| photoinitiator ("Irgacure 907", manufactured by Ciba Specialty Chemicals K.K.) and | 16 parts by mass, |
| cyclohexanone | 190 parts by mass |

EXAMPLE 2

A substrate illustrated in FIG. 17 was produced as follows:
In the present example, a black-matrix-forming photomask and a photoresist used were the same as in Example 1.

A black matrix 2 was formed onto a glass substrate 1a, and then an acrylic resin for an alkali-soluble and photosensitive photoresist was coated onto the glass substrate 1a including the black matrix 2 in such a manner that the film thickness of the resin would be 1.2 μm after drying. Using a photomask having an opening width of 10 μm for only the center of each photosensitive rectangular pixel, the workpiece was exposed to light, and further developed and subjected to a film-hardening treatment to form each transparent linear pattern 22 having a streak width of 12 μm.

Next, a transparent electroconductive film was laminated thereon in the same way as in Example 1.

Thereafter, a resin layer 18 was formed. A resist used therefor and a formation method therefor were the same as in Example 1. However, a photomask used for forming the resin layer 18 was different from that in Example 1, and a photomask having a linear light-shielding pattern at the center of each of the rectangular pixels was used.

Figure 17:
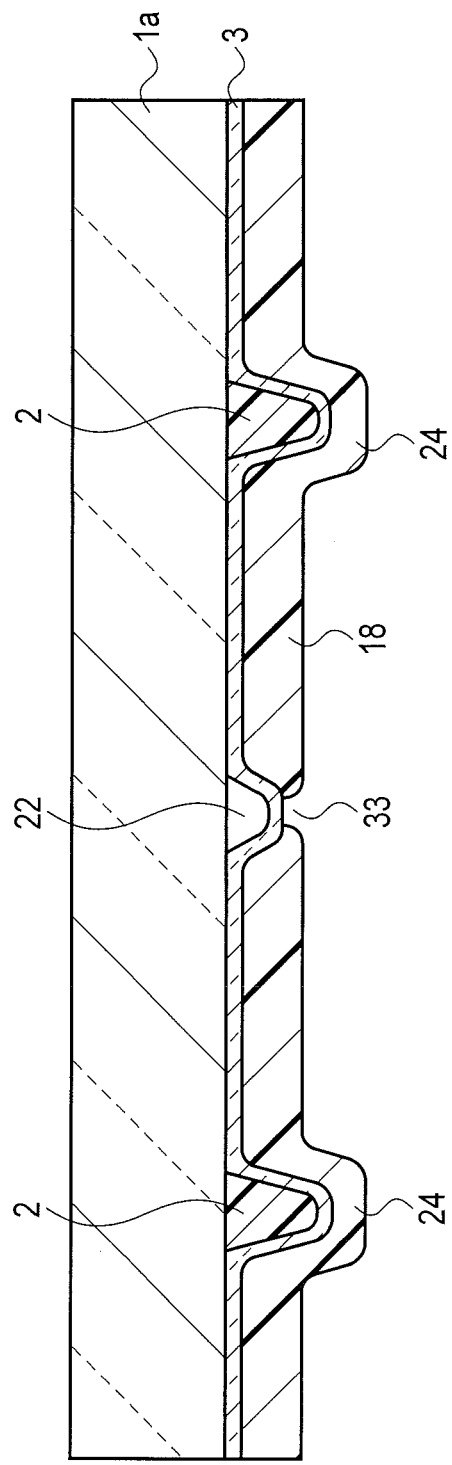
FIG. 17 is a partial sectional view illustrating a substrate according to Example 2.

Referring to FIG. 17, the produced substrate is described. The film thickness of the resin layer 18 is 1.8 μm. The height of the convex parts 24 of the resin layer 18 is 1 μm. At the center of each of the rectangular pixels, the linear pattern 22 made of the transparent resin (acrylic resin) is formed. Above this linear pattern 22, a concave part 33 is formed which has an opening width of 7 μm in the transparent electroconductive film and a depth of about 0.6 μm.

Instead of the acrylic resin used in the present example, the linear pattern may be formed by using a color layer containing organic pigments at a high concentration. According to the linear pattern made of the high-pigment-concentration color layer, leakage of a light ray in a linear form is eliminated so that display high in color purity can be attained.

EXAMPLE 3

A substrate illustrated in FIG. 18 was produced as follows:
In the present example, instead of the black-matrix-forming photomask used in Example 1, use was made of a photomask having not only a black-matrix-forming opening pattern but also an opening having a width of 11 μm for the center of each rectangular pixel. The opening width is made narrow, whereby the light exposure quantity decreases sharply; thus, a linear light-shielding pattern 32 having a small height is able to be formed at the center of the rectangular pixel.

Thereafter, a transparent electroconductive film 3 was laminated thereon in the same way as in Example 1.

A photomask used for forming the resin layer 18 was a photomask further including a light-shielding pattern having a width of 12 μm for the center of each of the rectangular pixels. A resist used therefor and a formation method were the same as in Example 1.

Figure 18:
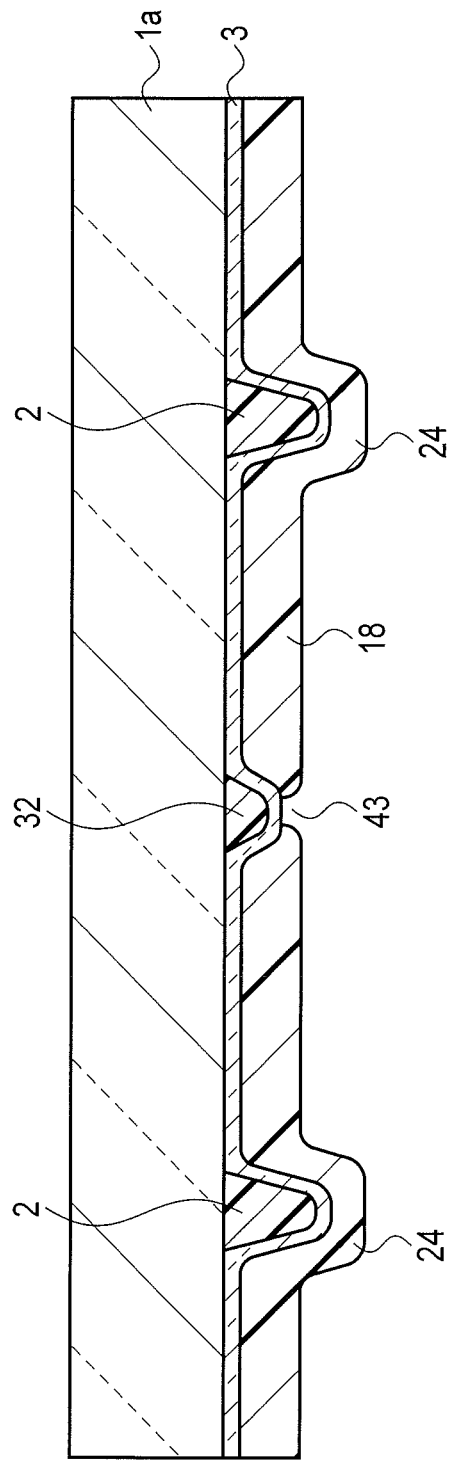
FIG. 18 is a partial sectional view illustrating a substrate according to Example 3.

Referring to FIG. 18, the produced substrate is described. Both of The film thicknesses of the resin layers 18 are 1.8 μm. The heights of convex parts 24 of the resin layers 18 are 1.1 μm. At the center of each of the rectangular pixels, the light-shielding pattern 32 made of the light-shielding layer (black-forming resist) is formed. Above this light-shielding pattern 32, a concave part 43 is formed which has an opening width of 7 μm in the transparent electroconductive film and a depth of about 0.6 μm.

In the present example, the black matrix and the light-shielding pattern at the center of each of the rectangular pixels were formed by using the single photomask. However, these may be formed by conducting a photolithographic method twice, using two independent photomasks for the black matrix and the light-shielding pattern.

EXAMPLE 4

Figure 19:
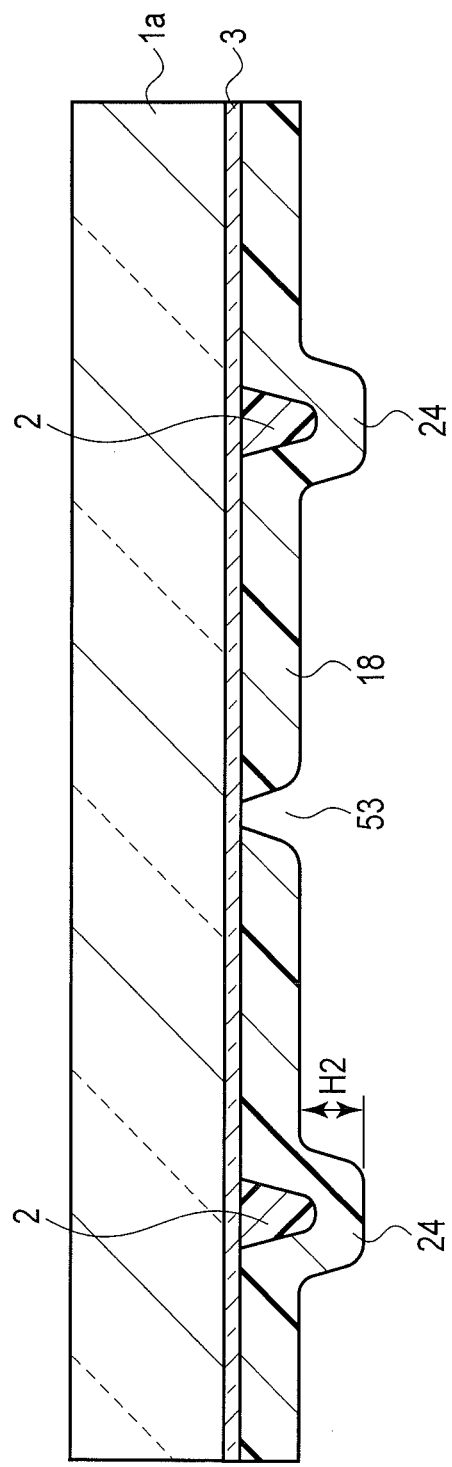
FIG. 19 is a partial sectional view illustrating a substrate according to Example 4.

A substrate illustrated in FIG. 19 was produced as follows:

A transparent electroconductive film 3 having a film thickness of 0.14 μm was formed onto a glass substrate 1a. A black matrix 2 was formed into a film thickness of 1.9 μm onto the transparent electroconductive film 3. A black-matrix-forming photoresist used therefor was the same as in Example 1.

Next, a coating liquid of an alkali-soluble acrylic photosensitive resin was used to form a resin layer 18 to cover the black matrix 2 and the rectangular openings in such a manner that the film thickness of the resin would be 1 μm after the resin turned into a hard film. The height $H_2$ of convex parts 24 of the resin layer 18 formed above the black matrix 2 was set to about 1 μm. The depth of each concave part 53 was 1 μm, and the transparent electroconductive film 3 was exposed to the concave part 53.

The substrate according to the present example includes no color filter. A color filter may be formed on the array substrate side. Alternatively, the substrate may be applied to a color liquid crystal display device in a field sequential mode (mode of using plural LED light sources as a backlight, and attaining a color display, without using any color filter, by time-sharing light-source-driving).

The acrylic photosensitive resin coating liquid used to form the resin layer 18 was the same as used in Example 1.

EXAMPLE 5

Figure 20:
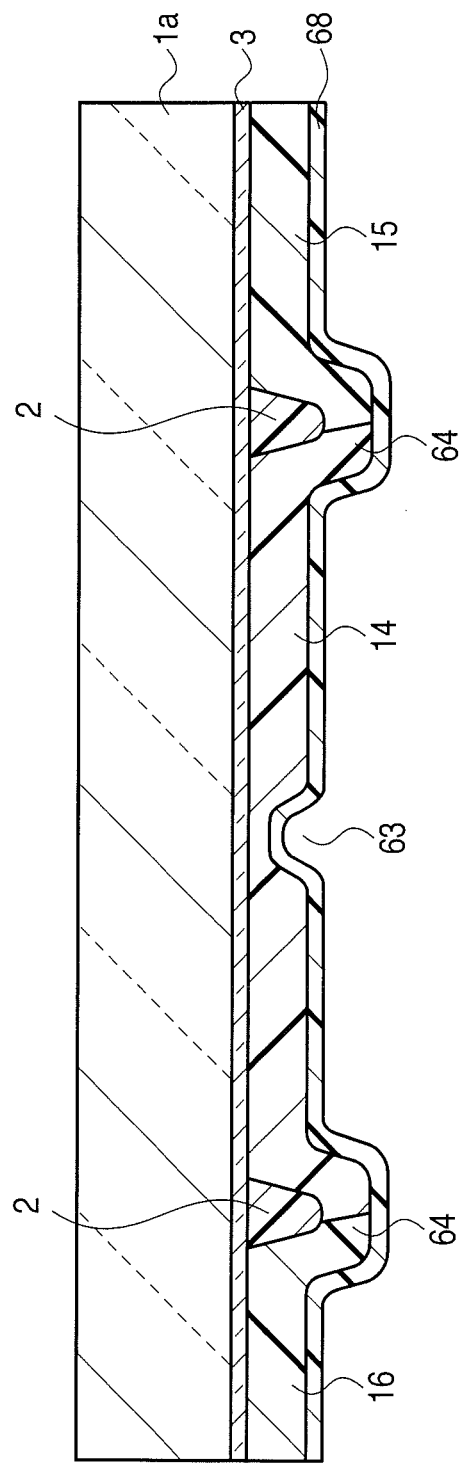
FIG. 20 is a partial sectional view illustrating a color filter substrate according to Example 5.

A color filter substrate illustrated in FIG. 20 was produced as follows:

A transparent electroconductive film 3 having a film thickness of 0.14 μm was formed above a glass substrate 1a. A black matrix 2 was formed above a film thickness of 1.9 μm above the transparent electroconductive film 3. A black-matrix-forming photoresist used therefor was the same as in Example 1.

Next, color pixels were formed to cover the black matrix 2 and the rectangular openings. Color resists used to form the color pixels, and a method for forming the color pixels are described below.

(Formation of Color Pixels)

<<Color-Layer-Forming Disperse Liquids>>

As organic pigments to be dispersed in the color layers, the following were used:

red pigments: C.I. Pigment Red 254 "IRGAFOR RED B-CF", manufactured by Ciba Specialty Chemicals K.K.), and C.I. Pigment Red 177 "CHROMOPHTAL RED A2B", manufactured by Ciba Specialty Chemicals K.K.);

green pigments: C.I. Pigment Green 58, and C.I. Pigment Yellow 150 ("FANCHON FAST YELLOW Y-5688", manufactured by Bayer AG); and blue pigments: C.I. Pigment Blue 15 ("LIONOL BLUE ES", manufactured by Toyo Ink Co., Ltd.), and C.I. Pigment Violet 23 ("PALIOGEN VIOLET 5890", manufactured by BASF SE).

These pigments were used to prepare red, green and blue disperse liquids.

<Red Pigment Disperse Liquid>

| | |
|---|---|
| Red pigment: C.I. Pigment Red 254 | 18 parts by mass |
| Red pigment: C.I. Pigment Red 177 | 2 parts by mass |
| Acrylic vanish (solid content by percentage: 20% by mass) | 108 parts by mass |

A mixture having this composition was stirred into an even state, and then glass beads were used to disperse the pigments in a sand mill for 5 hours, and the resultant was filtrated through a filter with a mesh of 5 μm to prepare the red pigment disperse liquid.

<Green Pigment Disperse Liquid>

| | |
|---|---|
| Green pigment: C.I. Pigment Green 58 | 16 parts by mass |
| Green pigment: C.I. Pigment Yellow 150 | 8 parts by mass |
| Acrylic vanish (solid content by percentage: 20% by mass) | 102 parts by mass |

The same preparation method as used for the red pigment disperse liquid was applied to a mixture having the above-mentioned composition to prepare the green pigment disperse, liquid.

<Blue Pigment Disperse Liquid>

| | |
|---|---|
| Blue pigment: C.I. Pigment Blue 15 | 50 parts by mass |
| Blue pigment: C.I. Pigment Violet 23 | 2 parts by mass |
| Dispersing agent ("SOLSPERS" 20000, manufactured by Zeneca Inc.) | 6 parts by mass |
| Acrylic vanish (solid content by percentage: 20% by mass) | 200 parts by mass |

The same preparation method as used for the red pigment disperse liquid was applied to a mixture having the above-mentioned composition to prepare the blue pigment disperse liquid.

(Color-Pixel-Forming Color Resists)

<Red-Pixel-Forming Color Resist>

| | |
|---|---|
| Red disperse liquid | 150 parts by mass |
| Trimetyhlolpropane triacrylate ("TMP3A", manufactured by Osaka Organic Chemical Industry Ltd.) | 13 parts by mass |
| Photoinitiator ("Irgacure 907", manufactured by Ciba Specialty Chemicals K.K.) | 4 parts by mass |

-continued

| | |
|---|---|
| Initiator ("EAB-F", manufactured by Hodogaya Chemical Co., Ltd.) | 2 parts by mass |
| Solvent: cyclohexanone | 257 parts by mass |

A mixture having this composition was stirred and mixed into an even state, and the resultant was filtrated through a filter with a mesh of 5 μm to prepare a red-pixel-forming color resist.

<Green-Pixel-Forming Color Resist>

| | |
|---|---|
| Green disperse liquid | 126 parts by mass |
| Trimetyhlolpropane triacrylate ("TMP3A", manufactured by Osaka Organic Chemical Industry Ltd.) | 14 parts by mass |
| Photoinitiator ("Irgacure 907", manufactured by Ciba Specialty Chemicals K.K.) | 4 parts by mass |
| Initiator ("EAB-F", manufactured by Hodogaya Chemical Co., Ltd.) | 2 parts by mass |
| Cyclohexanone | 257 parts by mass |

A mixture having this composition was stirred and mixed into an even state, and the resultant was filtrated through a filter with a mesh of 5 μm to prepare a green-pixel-forming color resist.

<Blue-Pixel-Forming Color Resist>

A blue-pixel-forming color resist was formed to be the composition thereof to have the following composition in the same way as used to form the red-pixel-forming color resist.

| | |
|---|---|
| Blue disperse liquid | 258 parts by mass |
| Trimetyhlolpropane triacrylate ("TMP3A", manufactured by Osaka Organic Chemical Industry Ltd.) | 19 parts by mass |
| Photoinitiator ("Irgacure 907", manufactured by Ciba Specialty Chemicals K.K.) | 4 parts by mass |
| Initiator ("EAB-F", manufactured by Hodogaya Chemical Co., Ltd.) | 2 parts by mass |
| Cyclohexanone | 214 parts by mass |

<<Color Pixel Formation>>

The respective color-pixel-forming color resists yielded by the above-mentioned methods were used to form color layers.

For the formation of the color layer, spin coating was first used to coat the red-pixel-forming color resist to give a finish film thickness of 1.8 μm onto the glass substrate 1a above which the transparent electroconductive film 3 and the black matrix 2 were formed. The workpiece was dried at 90° C. for 5 minutes, and then irradiated through a color-pixel-forming photomask with light from a high-pressure mercury lamp at a radiation quantity of 300 mJ/cm². The workpiece was developed with an alkaline developing solution for 60 seconds to yield red color pixel 15 in a stripe form. Thereafter, the workpiece was baked at 230° C. for 30 minutes. The pixel was formed to cause the color part to overlap the BM region by 14.0 μm. A slit of a half-tone (transflective part low in transmittance) was arranged for the center of the rectangular pixel to form a concave part (not illustrated) in a linear form when the region was viewed in plan. The depth of the concave part was set to about 1 μm.

Next, in the same way, the green-pixel-forming color resist was coated to give a finish film thickness of 1.8 μm by spin coating. The workpiece was dried at 90° C. for 5 minutes, exposed to light through a photomask to form a pattern in the region adjacent to the red pixel 15, and then developed to form green pixel 14. In the same way, a slit of a half-tone (transflective region low in transmittance) was arranged for the center of the pixel, which was rectangular, to form a concave part 63 in a linear form when the part 63 was viewed in plan. The depth of the concave part 63 was set to about 1 μm. Subsequently, the workpiece was subjected to heat treatment at 230° C. for 30 minutes to make the pixel films hard.

Furthermore, about the blue-pixel-forming color resist, also, in the very same way as about the red and green, a blue pixel 16 was yielded which had a finish film thickness of 1.8 μm and was adjacent to each of the red pixels and the green pixel (adjacent to this red pixel). In this way, a color filter was yielded which have the color pixels in the three colors, red, green and blue. Thereafter, the workpiece was subjected to heat treatment at 230° C. for 30 minutes to make the respective pixel-films hard. Thus, a color filter substrate was yielded.

Thereafter, a resin layer 68 made of a thermosetting acrylic resin was laminated into a film thickness of 0.2 μm onto the color pixels. The height of each convex part 64 was about 1 μm, and the depth of the concave parts 63 was about 0.9 μm. The resin layer 68 made the height of the convex parts 64 and the depth of the concave part 63 small values, respectively.

EXAMPLE 6

Figure 21:
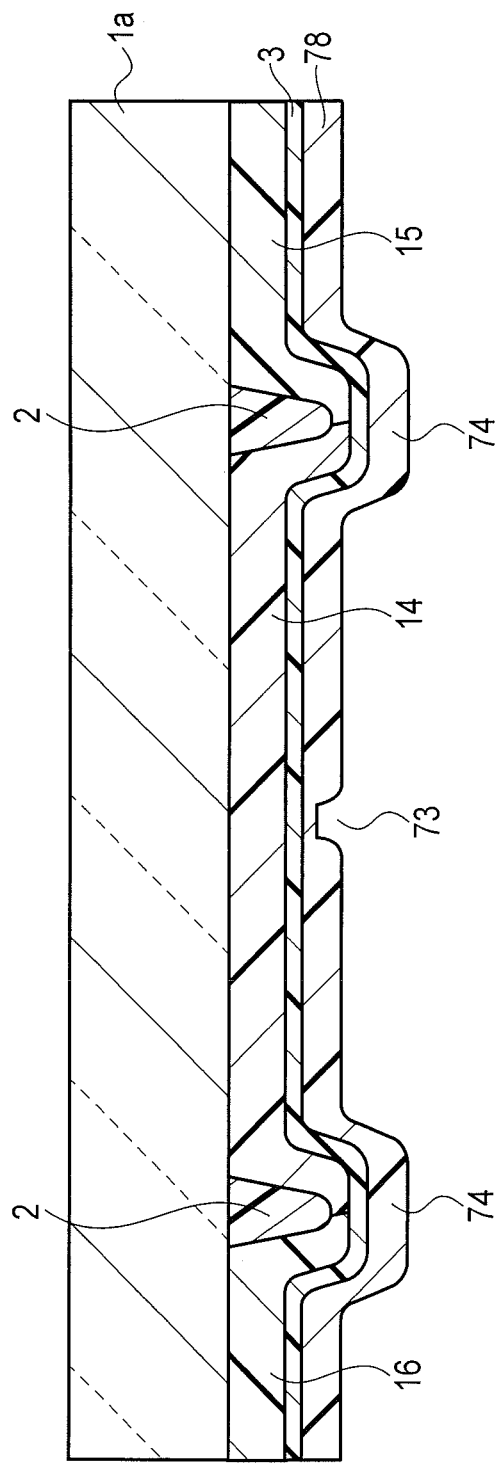
FIG. 21 is a partial sectional view illustrating a color filter substrate according to Example 6.

A color filter substrate illustrated in FIG. 21 was produced as follows:

A black matrix 2 was formed into a film thickness of 1.9 μm above a glass substrate 1a. A black-matrix-forming photoresist used therefor was the same as in Example 1. Next, the color resists used in Example 6 were used to form red color pixel 15, green colored 14 and blue color pixel 16, into a film thickness of 1.8 μm.

Thereafter, in the same way as in Example 5, a sputtering machine was used to form a transparent electroconductive film 3 into a film thickness of 0.14 μm. Furthermore, an alkali-soluble acrylic photosensitive resin was used to form a resin layer 78 to give a film thickness of 1.5 μm after this film was made hard. At this time, a known photolithographic method was used to make a concave part 73 having a depth of 1.2 μm in each of the openings, which were rectangular. For the formation of the pattern of the resin layer 78, use was made of a photomask having, at each of its rectangular openings, a pattern in the form of a slit. In the present example, the height of convex parts 74 was about 1.1 μm.

EXAMPLE 7

Figure 22:
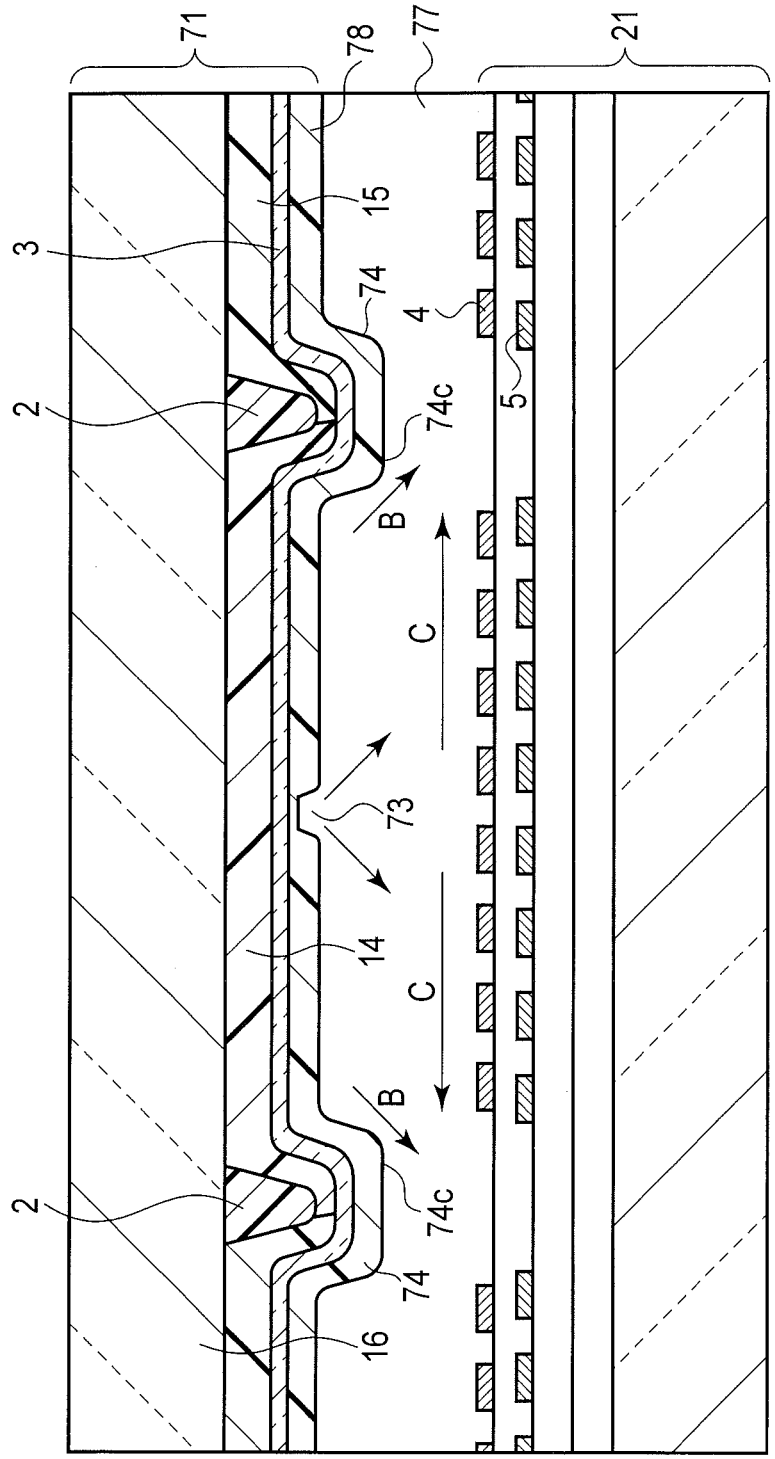
FIG. 22 is a sectional view illustrating a liquid crystal display device according to Example 7.

A liquid crystal display device according to the present example is shown in FIG. 22. A color filter substrate 81 used in the example was the color filter substrate of Example 7, which is illustrated in FIG. 21. An active-element-formed substrate used in this example was the array substrate 21 illustrated in FIGS. 8 and 9, which have the comb-teeth-form electrodes.

This color filter substrate 71 and the array substrate 21 were laminated to each other, and liquid crystals 77 having negative dielectric constant anisotropy were sealed in a gap therebetween. Furthermore, polarizing plates were laminated to both surfaces thereof, respectively, to produce the liquid crystal display device illustrated in FIG. 16. On respective surfaces of the color filter substrate 71 and the array substrate 21, vertically alignment films were beforehand printed and formed. Illustration of the vertically alignment films is omitted. Without performing strict alignment treatment necessary for a vertically aligned liquid crystal display device such as MVA, VATN, or the like (for example, to set a tilt angle to 89° and perform treatment for alignment in plural directions to form plural domains), the tilt angle of the vertical alignment may be about 90°.

Referring to FIG. 22, the produced liquid crystal display device is described. The motions of the liquid crystals 77 are typically described using a green pixel 14 at the center of FIG. 16.

When a driving voltage is applied, liquid crystal molecules of the liquid crystals 77, in which the initial alignment is vertical alignment, by a first electrode 4 and a second electrode 5 (as the above-mentioned comb-teeth-form electrodes), are inclined into directions from a line which divides the color pixel 14 from the center of rectangular pixel into two parts, toward respective shoulder parts 84c of convex parts 84, that is, directions represented by arrows B. The second electrode regions 5 are each protruded from an end of the corresponding first electrode region 4 into a direction represented by arrows C. Third electrode 3 and the second electrode 2 are made into a common potential.

In the present example, a concave part 73 is present at the center of the green pixel 14, so that in the color filter plane also, the liquid crystal molecules are inclined to be divided into two parts from the region passing through the center of rectangular-pixel. Combined with the effect of the comb-teeth-form first electrode 4 and second electrode 5 of the array substrate 21, it is possible to attain a bright display while disclination is restrained.

In the present example, the concave part 73 in the region passing through the center of each of the pixels improves light transmittance of the device; thus, the device is optimal for a liquid crystal display device which puts importance on brightness, such as a transflective type or reflection type display device. For example, a transflective type liquid crystal display device can be produced by adding, to a backlight system, a reflective polarizing plate which transmits light from its backlight and further makes it possible to reflect external light. The reflective polarizing plate may be, for example, a member described in Jpn. Pat. Appln. KOKAI Publication No. 4177398 as a reflective polarizer.

EXAMPLE 8

Figure 23:
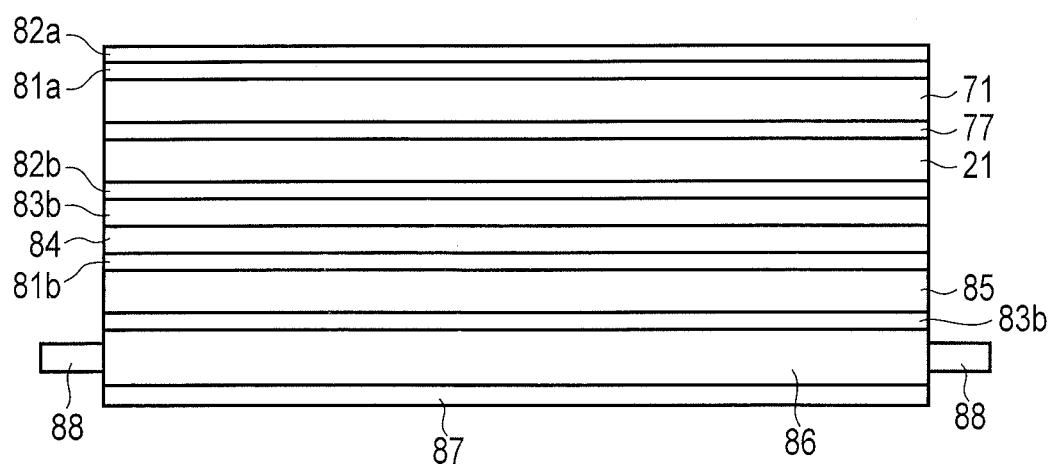
FIG. 23 is a sectional view illustrating a transflective type liquid crystal display device according to Example 8.

A liquid crystal display device according to the present example is illustrated in FIG. 23. This liquid crystal display device is a transflective type liquid crystal display device using a reflective polarizing plate. A color filter substrate 71 used in the example is the color filter substrate of Example 7, which is illustrated in FIG. 21. An array substrate on which active elements are formed may be the array substrate 21 as illustrated in FIGS. 8 and 9, which has the comb-teeth-form electrodes.

The device has a structure equivalent to the structure illustrated in FIG. 22, in which the color filter substrate 71 and the array substrate 21 are arranged to face each other, and the liquid crystals 77 is interposed in a gap therebetween. On a side of the color filter substrate 71 that is opposite to the liquid crystals 77, an optical compensation layer 81 and a polarizing plate 82a are formed. On a side of the array substrate 21 that is opposite to the liquid crystals 77, the following are successively formed: a polarizing plate 82b, a light diffusing layer 83a, a reflective polarizing plate 84, an optical compensation layer 81b, a prism sheet 85, a light diffusing layer 83b, a light guiding plate 86, and a light reflecting plate 87. A light source, for example, an LED light source 88 is attached to the light guiding plate 86.

The LED light source 88 desirably includes RGB-independently light-emitting elements. However, the light source 88 may be pseudo-white LEDs. Instead of the LEDs, a cold cathode ray tube or a fluorescent lamp, which is ordinarily used in the prior art, may be used. When the RGB-independently light-emitting elements are used for the LED light source 88, the respective emission intensities thereof can be adjusted independently for each of the colors. Thus, an optimal color display can be attained. The device may be applied to a three-dimensional image display.

By use of a substrate which contains no color filter as used in Example 4, instead of the color filter substrate, color display can be attained in a field sequential mode in which LED light sources emitting RGB rays independently are synchronized with the liquid crystal display.

EXAMPLE 9

Figure 24:
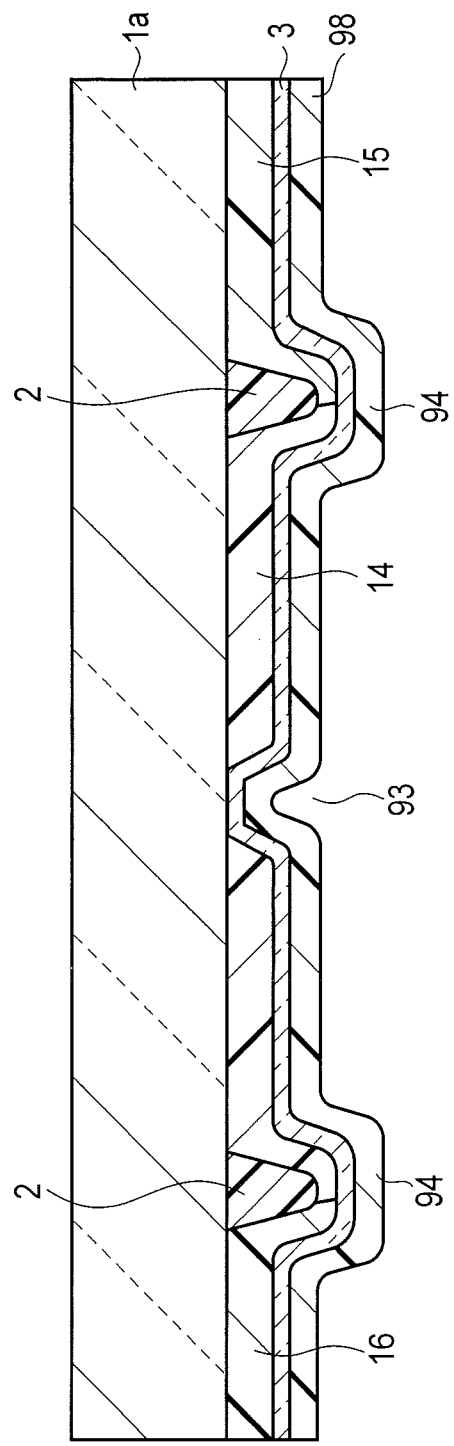
FIG. 24 is a sectional view illustrating a color filter substrate according to Example 9.

A color filter substrate illustrated in FIG. 24 was produced as follows:

A black matrix 2 was formed into a film thickness of 1.9 µm above a glass substrate 1a. A black-matrix-forming photoresist used therefor was the same as in Example 5. Next, the color resists used in Example 6 were used to form red color pixel 15, green color pixel 14 and blue color pixel 16 into a film thickness of 1.8 µm. A photomask used to form each of the color pixels was a photomask having light-shielding patterns along respective central lines which divide a part corresponding to each of the rectangular pixels into two parts. In this way, a liner concave part of 10 µm in width and 1.8 µm in depth was made at the center of each of the color pixels.

Thereafter, in the same way as in Example 5, a sputtering machine was used to form a transparent electroconductive film 3 into a film thickness of 0.14 µm to cover the red color pixel 15, the green color pixel 14 and the blue color pixel 16.

Next, a solution of a thermosetting type acrylic resin was used to form a resin layer 98 to give a film thickness of 0.8 µm after the resin was made into a hard film. As a result, each convex part 94 was formed which was an overlap part made of the black matrix 2, the color pixels 14, 15 and 16, the transparent electroconductive film 3, and the resin layer 98. Moreover, a linear concave part 93 was formed at the center of each of the rectangular pixels. The height $H_3$ of the convex parts 94 was about 1 µm, and the depth of the concave parts 93 was 0.7 µm.

When the color filter substrate according to the present example is used for a reflection type display device, the linear concave part 93 at the center of each of the pixels can function as an opening for improving the pixel in brightness. In the case of transmission display using a backlight, light leakage from the backlight can be restrained by forming TFT interconnects (for example, drain-drawing interconnects or auxiliary capacitor interconnects) as a light-shielding membrane at positions where the interconnects are to overlap the linear concave parts when viewed in plan.

EXAMPLE 10

Figure 25:
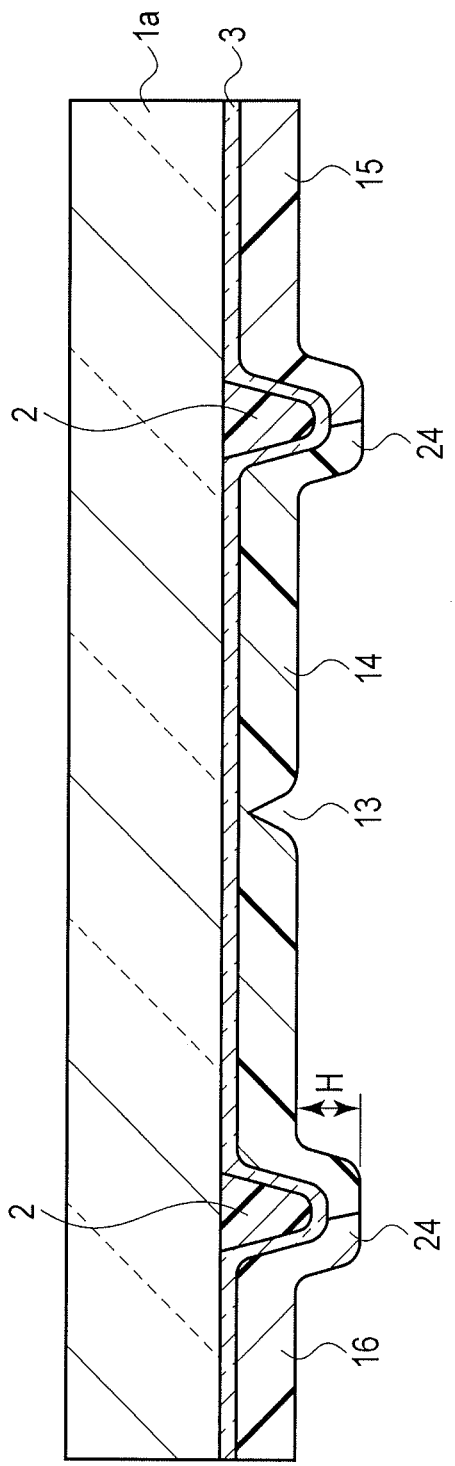
FIG. 25 is a sectional view illustrating a color filter substrate according to Example 10.

A color filter substrate illustrated in FIG. 25 was produced in the same way as in Example 5 except that the resin layer 68 made of the thermosetting type acrylic resin was not formed above the color pixels 14, 15 or 16.

EXAMPLE 11

A color filter substrate illustrated in FIG. 26 was produced as follows:

A black-matrix-forming photomask and photoresist used in the present example were the same as those in Example 1.

A black matrix 2 was formed above a glass substrate 1a, and then an acrylic resin of an alkali-soluble and photosensitive photoresist was coated above the glass substrate 1a including the black matrix 2 in such a manner that the film thickness of the resin would be 1.2 μm after the workpiece was dried. Using a photomask having an opening width of 10 μm for only the center of each photosensitive rectangular pixel, the workpiece was exposed to light, and further developed and subjected to a film-hardening treatment to form each transparent linear pattern 22 having a pixel line width of 12 μm.

Next, a transparent electroconductive film 3 was laminated thereon in the same way as in Example 1.

Thereafter, color pixels were formed. Color resists used therefor, and formation methods therefor were the same as those in Example 5. However, a color-pixel-forming photomask used therefor, which is different from those in Example 5, is a photomask in which a linear light-shielding pattern is present at the center of the rectangular pixel.

Referring to FIG. 26, the produced color filter substrate is described. The film thickness of each of red pixel 15, green pixel 14 and blue pixel 16 is 1.8 μm. The height of convex part 24, which is an overlap part of two of the color layers, is 1 μm. The linear pattern 22, which is firmed by the transparent resin (acrylic resin), is formed at the center of each of the rectangular pixels. A concave part 33 having an opening width of 7 μm in the transparent electroconductive film and a depth of about 0.6 μm is made above the linear pattern 22.

The linear pattern may be formed by use of a color layer containing organic pigments at a concentration higher than the pigment concentration in the color pixels instead of the acrylic resin used in the present example. This linear pattern, which is the color layer having the higher pigment concentration, makes it possible to prevent leakage of a light ray in a linear form to attain a high color-purity display.

EXAMPLE 12

A color filter substrate illustrated in FIG. 27 was produced as follows:

In the present example, instead of the black-matrix-forming photomask used in Example 1, a photomask having not only a black-matrix-forming opening pattern but also an opening having a width of 11 μm for the center of each rectangular pixel, was used. Since the opening width was made narrow, the light exposure quantity was able to be sharply reduced; thus, a linear light-shielding pattern 32 having a small height can be formed at the center of the rectangular pixel.

Thereafter, a transparent electroconductive film 3 was laminated thereon in the same way as in Example 1.

A color-pixel-forming photomask used was a photomask having a light-shielding pattern further having a width of 12 μm for the center of the rectangular pixel. Color resists and production methods used were the same as in Examples 5 and 11.

Figure 27:
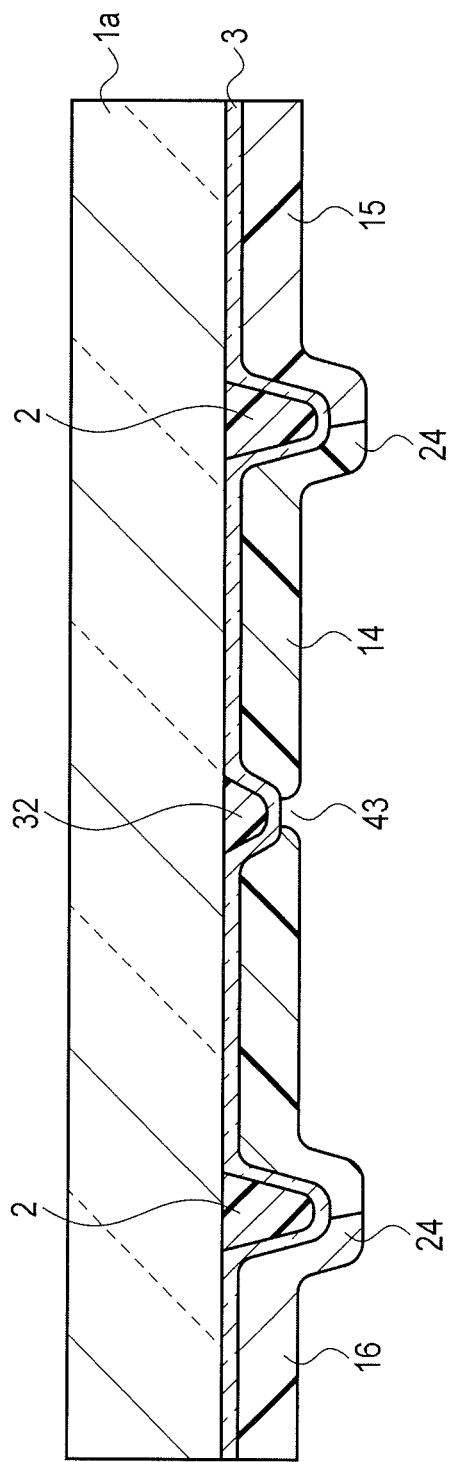
FIG. 27 is a sectional view illustrating a color filter substrate according to Example 12.

Referring to FIG. 27, the produced color filter substrate is described. The film thickness of each of red pixel 15, green pixel 14 and blue pixel 16 is 1.8 μm. The height of convex part 24, which is an overlap part of two of the color layers, is 1.1 μm. The linear pattern 32, which is the light-shielding layer (black-forming resist), is formed at the center of each of the rectangular pixels. A concave part 43 having an opening width of 7 μm in the transparent electroconductive film and a depth of about 0.6 μm is formed above the light-shielding pattern 32.

In the present example, the black matrix and the light-shielding pattern at the center of the rectangular pixel were formed by the single photomask. However, the black matrix and the light-shielding pattern may be formed by performing a photolithographic method twice, using two independent photomasks.

EXAMPLE 13

A color filter substrate illustrated in FIG. 28 was produced as follows:

In the present example, materials and production methods used to form a black matrix and color pixels were made the same as in Examples 5 and 10. However, a photomask used to form the color pixel is a photomask having an opening for each rectangular pixel part (photomask having neither halftone nor linear light-shielding pattern for the center of the rectangular pixel).

Figure 28:
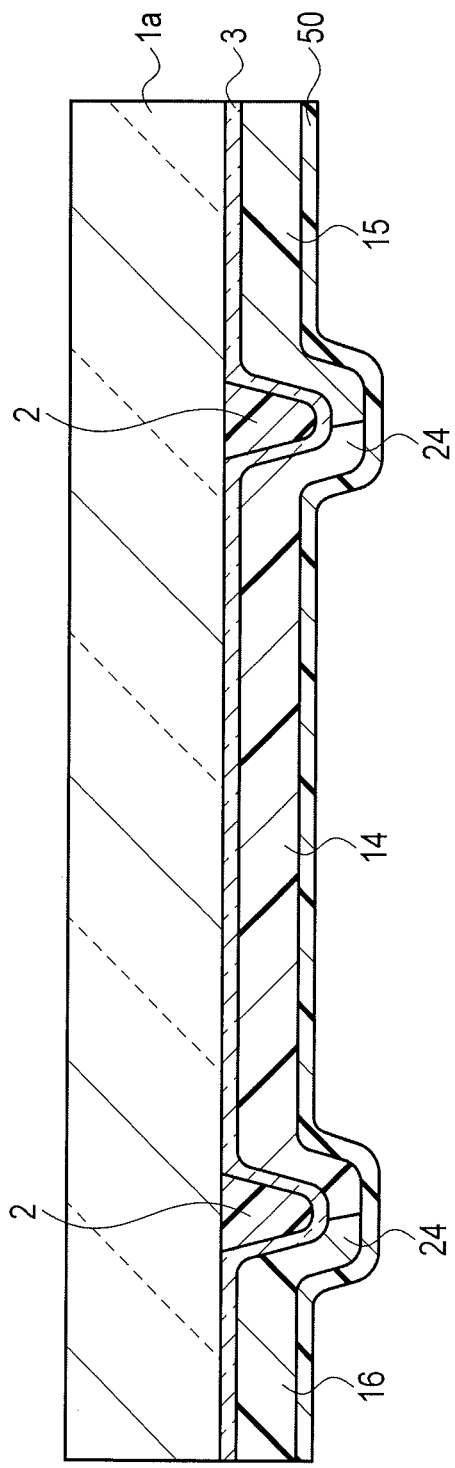
FIG. 28 is a sectional view illustrating a color filter substrate according to Example 13.

Referring to FIG. 28, the produced color filter substrate is described. The film thickness of each of red pixel 15, green pixel 14 and blue pixel 16 is 1.8 μm. The height of the convex part 24, which is an overlap part of two of the color layers, is 1 μm. The present example is formed to have a structure in which a protecting layer 50 made of a thermosetting type acrylic resin is laminated into a film thickness of 0.3 μm over the color filter.

EXAMPLE 14

The color filter substrate according to Example 13 and an array substrate on which active elements of TFTs were formed were laminated to each other, and then liquid crystals having negative dielectric constant anisotropy were sealed in a gap therebetween. Furthermore, polarizing plates were laminated to both surfaces thereof, respectively, to produce a liquid crystal display device illustrated in FIG. 29. On respective surfaces of the color filter substrate and the array substrate, vertically alignment films were beforehand printed and formed. The active-element-formed substrate was an array substrate which had comb-teeth-form elements as illustrated in FIGS. 14 and 15.

Illustration of the vertically alignment films is omitted. Without performing a strict alignment treatment necessary for a vertically aligned liquid crystal display device such as MVA, VATN, or the like (for example, to set the tilt angle to 89° and perform treatment for alignment in plural directions to form plural domains), vertical alignment giving the tilt angle of about 90° was performed.

Figure 29:
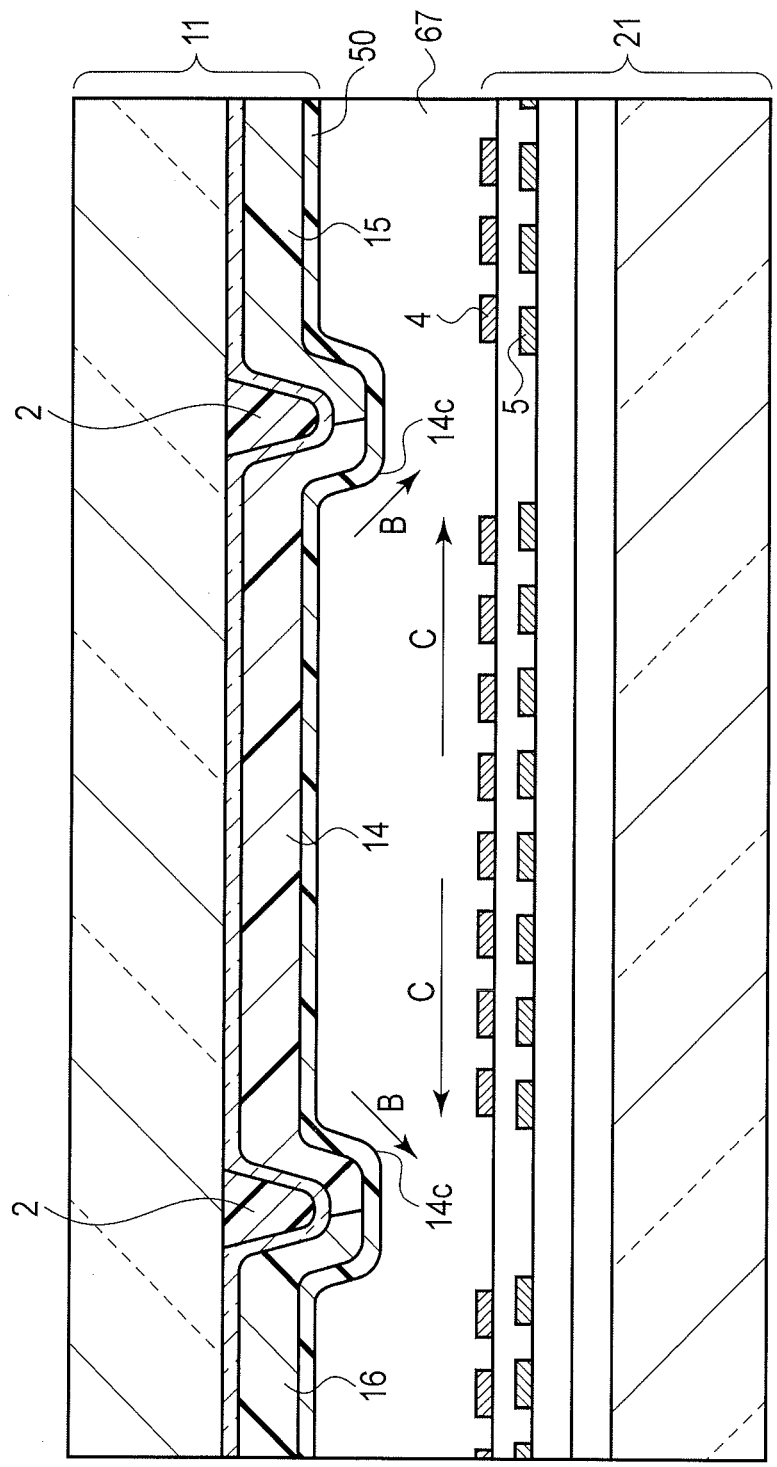
FIG. 29 is a sectional view illustrating a liquid crystal display device according to Example 14.

Referring to FIG. 29, the produced liquid crystal display device is described. The motions of liquid crystals 67 are typically described by green pixel 14 at the center of FIG. 29.

When a driving voltage is applied, liquid crystal molecules of the liquid crystals 67, in which the initial alignment is vertical alignment, by a first electrode 4 and a second electrode 5 (as the comb-teeth-form electrodes), are inclined into directions from a line which divides the color pixel 14 from the center of the rectangular pixel into two parts, toward respective shoulder parts 14c, that is, directions represented by arrows B. The second electrodes 5 are each shifted from the corresponding first electrode 4 into a direction represented by arrows C. Third electrode 3 and the second electrode 2 may be a common potential.

EXAMPLE 15

Figure 30:
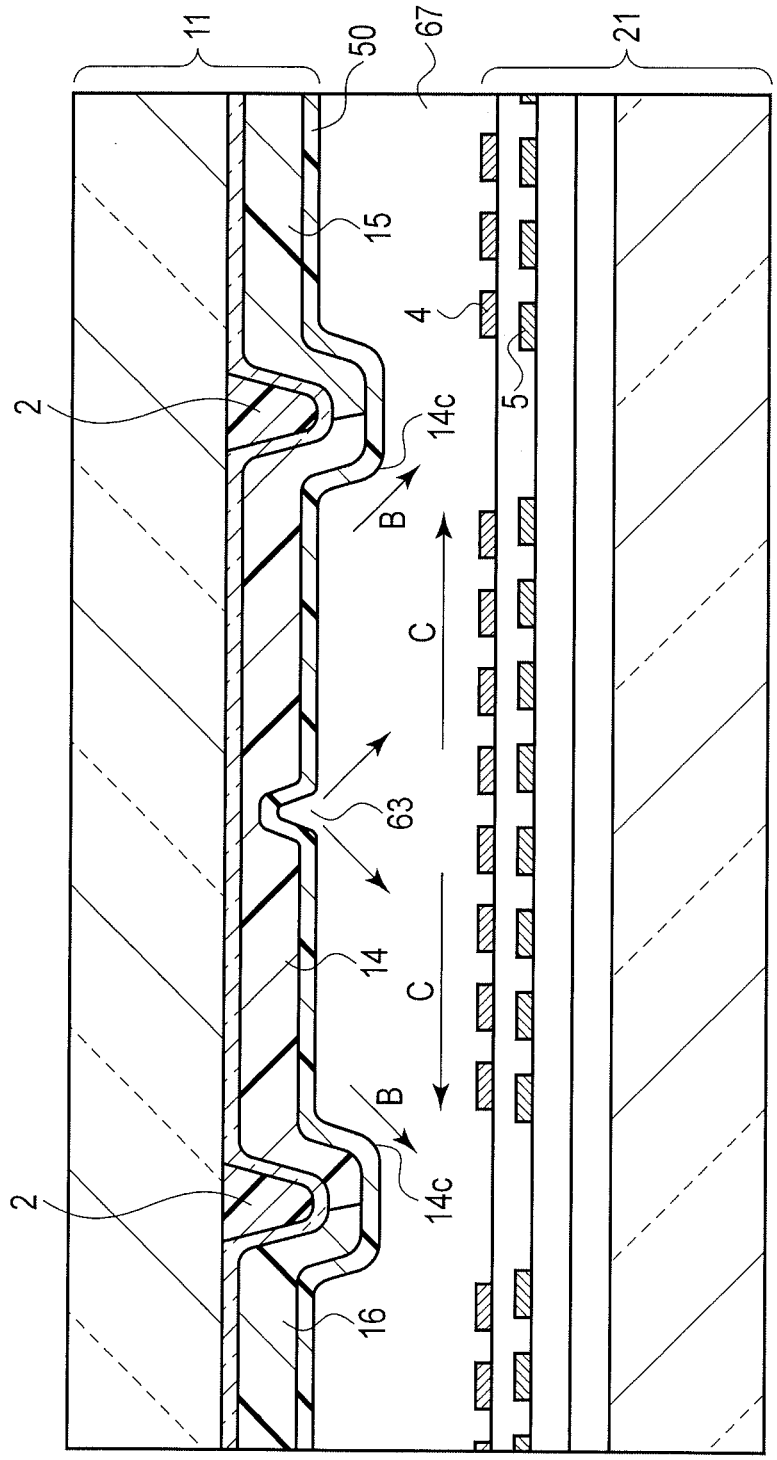
FIG. 30 is a sectional view illustrating a liquid crystal display device according to Example 15.

A liquid crystal display device according to the present example is illustrated in FIG. 30. A color filter substrate 11 used in the example was a substrate yielded by laminating a protecting layer 50 made of a thermosetting type acrylic resin into a film thickness of 0.2 μm above a color filter substrate having the same structure as Example 10. An array substrate 21 was an array substrate having the same structure as Example 14.

The liquid crystal display device illustrated in FIG. 30 was produced by laminating the color filter substrate 11 and the array substrate 21, on which a vertically alignment film was beforehand formed, onto each other, forming the liquid crystals 67 having negative dielectric constant anisotropy into a gap therebetween, and further laminating polarizing plates onto both surfaces thereof, respectively. Illustration of the vertically alignment films is omitted. Without performing a strict alignment treatment necessary for a vertically aligned liquid crystal display device such as MVA, VATN, or the like (for example, to set the tilt angle to 89° and perform treatment for alignment in plural directions to form plural domains), vertical alignment giving the tilt angle of about 90° was performed.

Referring to FIG. 30, the produced liquid crystal display device is described. The motions of the liquid crystals 67 are typically described using a green pixel 14 at the center of FIG. 30.

When a driving voltage is applied, liquid crystal molecules of the liquid crystals 67, in which the initial alignment is vertical alignment, by a first electrode 4 and a second electrode 5 (as the comb-teeth-form electrodes), are inclined into directions from a line which divides the color pixel 14 from the center of the rectangular pixel into two parts, toward respective shoulder parts 14c, that is, directions represented by arrows B. The second electrodes 5 are each shifted from the corresponding first electrode region 4 into a direction represented by arrows C. Third electrode 3 and second electrode 2 may be a common potential.

In the present example, a concave part 63 is present at the center of the green pixel 14, so that in the color filter plane also, the liquid crystal molecules are inclined to be divided from the center of the rectangular-pixel into two parts. Combined with the effect of the comb-teeth-form first electrode 4 and second electrode 5 of the array substrate 21, it is possible to attain a bright display while disclination is restrained. In the present example, the concave part 63 at the center improves light transmittance of the device; thus, the device is optimal for a liquid crystal display device in which puts importance on brightness, such as a transflective type or reflection type device. For example, a transflective type liquid crystal display device can be produced by adding, to a backlight system, a reflective polarizing plate which transmits light from its backlight and further makes it possible to reflect external light. The reflective polarizing plate may be, for example, a member as a reflective polarizer described in Jpn. Pat. Appln. KOKAI Publication No. 4177398.

EXAMPLE 16

Figure 31:
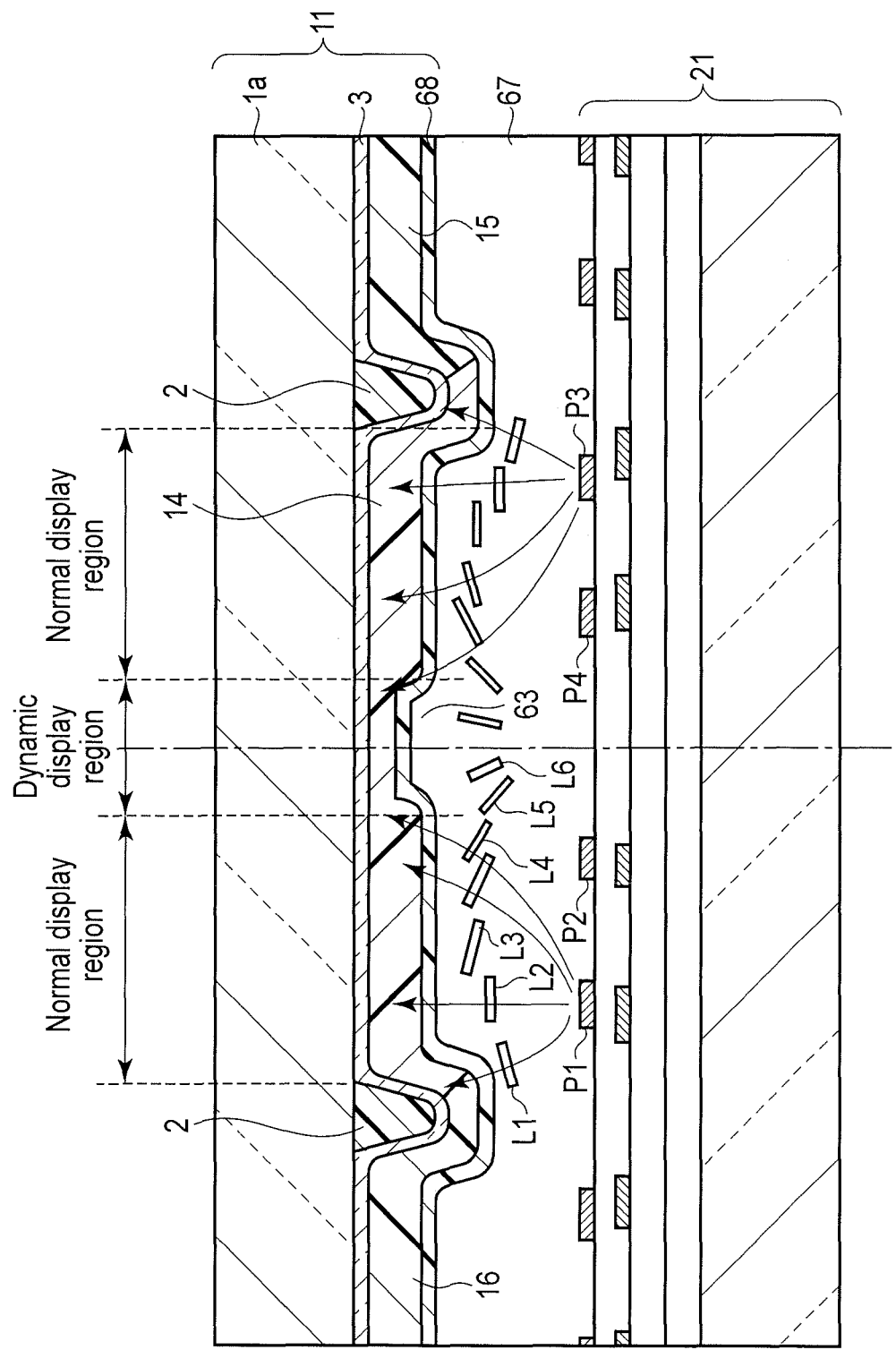
FIG. 31 is a sectional view illustrating a liquid crystal display device according to Example 16.

A liquid crystal display device according to the present example is illustrated in FIGS. 31 and 32. In the liquid crystal display device according to the example, two TFTs (not illustrated) are arranged as active elements in each pixel.

FIGS. 31 and 32 are each a sectional view of a green pixel region in which a TFT1 and a TFT2 are arranged in each of the pixels, respectively. First electrodes P1 and P3 are connected to the TFT1; and second electrodes P2 and P4 to the TFT2. For the convenience of description, as illustrated in the figures, this green pixel is divided into a normal display region and a dynamic display region. Hereinafter, a description will be made about the driving of liquid crystal molecules in a half region of the pixel. The green pixel is formed to have a small film thickness at the center of the green pixel in the same way as in Example 5 illustrated in FIG. 20.

FIG. 31 illustrates the alignment of the liquid crystal molecules in the state that a driving signal is sent to the TFT1 so that a driving voltage is applied only to the first electrodes P1 and P3. In this case, liquid crystal molecules L1, L2 and L3 in the normal display region are sufficiently inclined so that the region can gain a sufficient transmittance. However, liquid crystal molecules L4, L5 and L6 in the dynamic display region at the center of the pixel are insufficiently inclined so that the region is in a low transmittance state.

FIG. 32 illustrates the alignment of the liquid crystal molecules in the state that a driving signal is sent also to the TFT2 so that a driving voltage is applied to the first electrodes P2 and P4. In this case, in the liquid crystal molecules L4, L5 and L6 in the dynamic display region at the center of the pixel, as well as the liquid crystal molecules L1, L2 and L3 in the normal display region, are sufficiently inclined so that the dynamic display region turns high in transmittance. In this case, the part of the pixel center is formed to have a small film thickness, so that transmitted light is increased to make it possible to attain a very bright display (dynamic display).

The liquid crystal display devices according to the embodiments and examples described hereinbefore each make it possible to decrease alignment treatments for its color filter substrate and its array substrate, and further improve the response of its liquid crystals. Moreover, its structure in which convex and concave parts and first and second electrodes are formed makes it possible to decrease the disclination of the liquid crystals to enhance the display of the liquid crystals.

Furthermore, the display device can be formed to have a structure in which a transparent electroconductive film is laminated to cover effective display pixels of its color filter; thus, the following liquid crystal display device can be supplied as a secondary advantageous effect: a device in which an external electric field is not easily affected, the mode of this device is different from the IPS mode (of driving liquid crystals by effect of a transverse electric field) or the FFS mode (of driving liquid crystals by effect of an electric field generated in fringes of comb-teeth-form electrodes).

Each of the pixels of the liquid crystal display devices according to the above-mentioned embodiments and examples is divided into ½-pixels that are linearly symmetrical with each other, or ¼-pixels that are centrosymmetrical with each other about the linear concave part. However, by forming 2 to 4 TFTs in each of the pixels and further adopting a driving mode of applying different voltages thereto, the viewing angle can be adjusted or a three-dimensional image can be displayed.

REFERENCE SIGNS LIST 1a, and 1b . . . transparent substrates
2 . . . black matrix
3 . . . transparent electrode (third electrode)
4 . . . first electrode(s)
5 . . . second electrode(s)

11, and 71 . . . color filter substrates
14 . . . green pixel
14a, 14b, 14c and 84c . . . shoulder part
15 . . . red pixel
16 . . . blue pixel
17, 27, 67 and 77 . . . liquid crystals
17a, 17b, 17c, and 17d . . . liquid crystal molecules
18, 68, 78 and 98 . . . resin layers
21 . . . array electrode
23, 33, 43, 53, 63, 83 and 93 . . . concave parts
24, 64, 74, 84 and 94 . . . convex parts
81a and 81b . . . optical compensation layers
82a and b . . . polarizing plates
83a and 83b . . . light diffusing layers
84 . . . reflective polarizing plate
85 . . . prism sheet
86 . . . light guiding sheet
87 . . . light reflecting plate
88 . . . LED light source

What is claimed is:

1. A liquid crystal display device, comprising:
a liquid crystal display device substrate comprising
 a transparent substrate,
 a black matrix which is formed on the transparent substrate, is a light-shielding layer in which light-shielding pigments are dispersed in a resin, and comprises openings,
 a transparent electroconductive film which is formed on the black matrix to cover the black matrix and the openings,
 a resin layer formed above the transparent substrate, the black matrix and the transparent electroconductive film, the resin layer comprising a convex part above the black matrix, and comprising, in a region that passes through a center of each of the openings in the black matrix, a concave part that is in a linear form or cross form when viewed in plan, and the resin layer being thin or absent in the concave part and the convex part, and
 rectangular pixels formed above the transparent substrate;
an array substrate which is arranged opposite to the liquid crystal display device substrate, and comprising liquid-crystal-driving elements arranged in a matrix form thereon; and
liquid crystals which are held between the liquid crystal display device substrate and the array substrate, wherein
the array substrate comprises a first electrode and a second electrode to which different electric potentials are applied in order to drive each of the rectangular pixels,
when a voltage for driving the liquid crystals is applied to the first and second electrodes, liquid crystal molecules act to be inclined from the concave part of the resin layer into a direction which is Parallel to the concave part and is a direction toward the black matrix near the liquid crystal molecules when viewed in plan,
the first electrode and/or the second electrode is/are not arranged at a position of the array substrate which corresponds to a center of a width of a pattern of the black matrix, and
the first electrode is formed at a position other than a position which corresponds to a center of a width of a pixel line of the black matrix.

2. The liquid crystal display device of claim 1,
wherein when a driving voltage is applied to the first electrode, and the second electrode and a third electrode, the third electrode being the transparent electroconductive film, liquid crystal molecules in each of the pixel regions of the liquid crystal display device act to be inclined into reverse directions which are linearly symmetrically to a straight line by which the pixel region is divided into two parts.

3. The liquid crystal display device of claim 1,
wherein the first electrode of the array substrate is an electrode comprises a comb-teeth pattern connected to an active element that drives the liquid crystals; and
the second electrode which is an electrode comprising a comb-teeth pattern similar to that of the first electrode is formed below the first electrode via an insulating layer, and is protruded from an end of the first electrode into a direction along which the liquid crystals are inclined.

4. The liquid crystal display device of claim 1,
wherein the first and second electrodes each comprise electroconductive metal-oxides which is transparent in a range of visible wavelengths.

5. The liquid crystal display device of claim 1,
wherein the liquid crystals have negative dielectric constant anisotropy.

6. A liquid crystal display device, comprising:
a color filter substrate and an array substrate,
wherein the color filter substrate and the array substrate are opposed and stuck to each other via liquid crystals,
the color filter substrate comprises
 a transparent substrate,
 a black matrix which is formed on the transparent substrate, is a light-shielding layer in which light-shielding pigments are dispersed in a resin, and comprises rectangular openings,
 a transparent electroconductive film which is formed on the black matrix to cover the black matrix and the openings,
 a resin layer formed above the transparent substrate, the black matrix and the transparent electroconductive film, the resin layer comprising a convex part above the black matrix, and comprising, in a region that passes through a center of each of the openings in the black matrix, a concave part that is in a linear form or cross form when viewed in plan, and the resin layer being thin or absent in the concave part and the convex part, and
 color pixels, formed above the transparent substrate,
the array substrate comprises elements driving the liquid crystals and being arranged in a matrix form,
the resin layer is arranged directly or indirectly above the transparent electroconductive film,
the convex part is protruded from a surface of the resin layer,
the concave part is formed in a region that passes through a center of each of the rectangular openings in the black matrix,
the array substrate comprises a comb-teeth-form first electrode and a comb-teeth-form second electrode each of which comprises electroconductive metal-oxides which is transparent in a range of visible wavelengths,
the second electrode is arranged below the first electrode via an insulating layer between the first and second electrodes, and
the second electrode is protruded from an end of the first electrode into a direction along which the liquid crystals are inclined.

7. The liquid crystal display device of claim 6, wherein two to four elements that drive the liquid crystals are arranged for each of the pixels, and the two to four elements are connected to different electrodes, respectively.

* * * * *

UNITED STATES PATENT AND TRADEMARK OFFICE
CERTIFICATE OF CORRECTION

| | | |
|---|---|---|
| PATENT NO. | : 9,285,644 B2 | Page 1 of 1 |
| APPLICATION NO. | : 13/686159 | |
| DATED | : March 15, 2016 | |
| INVENTOR(S) | : Hidesato Hagiwara et al. | |

It is certified that error appears in the above-identified patent and that said Letters Patent is hereby corrected as shown below:

In the Claims

Claim 1, Column 33, Line 54:
Delete "Parallel" and insert -- parallel --, therefor.

Claim 6, Column 34, Line 44:
Delete "pixels," and insert -- pixels --, therefor.

Signed and Sealed this
Seventh Day of June, 2016

Michelle K. Lee
*Director of the United States Patent and Trademark Office*